United States Patent [19]
Endo et al.

[11] Patent Number: 5,422,940
[45] Date of Patent: Jun. 6, 1995

[54] GLOBAL SUBSCRIBER GROUP SERVICE SYSTEM

[75] Inventors: Kazumi Endo; Mitsuyuki Mizuno; Nobuo Horiba; Kenji Awaji, all of Kawasaki; Yoshiji Tanimoto, Funabashi, all of Japan

[73] Assignees: Fujitsu Limited, Kawasaki; Nippon Telegraph and Telephone Corporation, Tokyo, both of Japan

[21] Appl. No.: 871,411

[22] Filed: Apr. 20, 1992

[30] Foreign Application Priority Data

Apr. 18, 1991 [JP] Japan .................. 3-113905

[51] Int. Cl.6 .................................. H04M 3/42
[52] U.S. Cl. .......................... 379/207; 379/201
[58] Field of Search ............ 379/201, 207, 220, 221

[56] References Cited

U.S. PATENT DOCUMENTS

| | | | |
|---|---|---|---|
| 4,348,554 | 9/1982 | Asmuth | 379/221 |
| 4,982,421 | 1/1991 | Kirsch et al. | 379/207 |
| 5,095,505 | 3/1992 | Finucane et al. | 379/201 |
| 5,241,588 | 8/1993 | Babson, III et al. | 379/201 |
| 5,259,026 | 11/1993 | Johnson | 379/207 |
| 5,323,452 | 6/1994 | Dickman et al. | 379/207 X |

OTHER PUBLICATIONS

Berger et al., "New Customer-Defined Network Service", Telephony Mar. 10, 1986, pp. 50-60.
Pierce et al., "Meeting Private Needs with the Public Network," Bellcore Exchange, Jan./Feb. 1988 pp. 8-13.
Miller, "Intelligent Network/2: A Flexible Framework for Exchange Service", Bellcore Exchange, May/Jun. 1987 pp. 9-13.
Doyle et al., "the Intelligent Network Concept," IEEE Transactions on Communications, vol. 36 No. 12 Dec. 1988 pp. 1296-1301.
van Hal et al., "Service Script Interpreter, an Advanced Intelligent network Platform," Ericsson Review No. 1, 1990 pp. 12-22.
Dunogue et al, "The Building of Intelligent networks, Architecture and Systems from Alcatel," Commutation & Transmission No. 2 1989 pp. 5-22.
Boese et al., "Service Control Point: The Brains Behind the Intelligent Network," Bellcore Exchange, Nov./Dec. 1987 pp. 13-17.

Primary Examiner—James L. Dwyer
Assistant Examiner—Daniel S. Hunter
Attorney, Agent, or Firm—Staas & Halsey

[57] ABSTRACT

A global subscriber group service system capable of accommodating individual subscribers as a terminal within a global subscriber group. The system also permits the subscriber to access a service control node for new registration or modification of the types of services. The system, therefore, includes a customer access function in a local switching node that is controlled by the service control node. The customer access permits the subscriber to access the service control node to make a necessary registration or a change of the type of services.

15 Claims, 38 Drawing Sheets

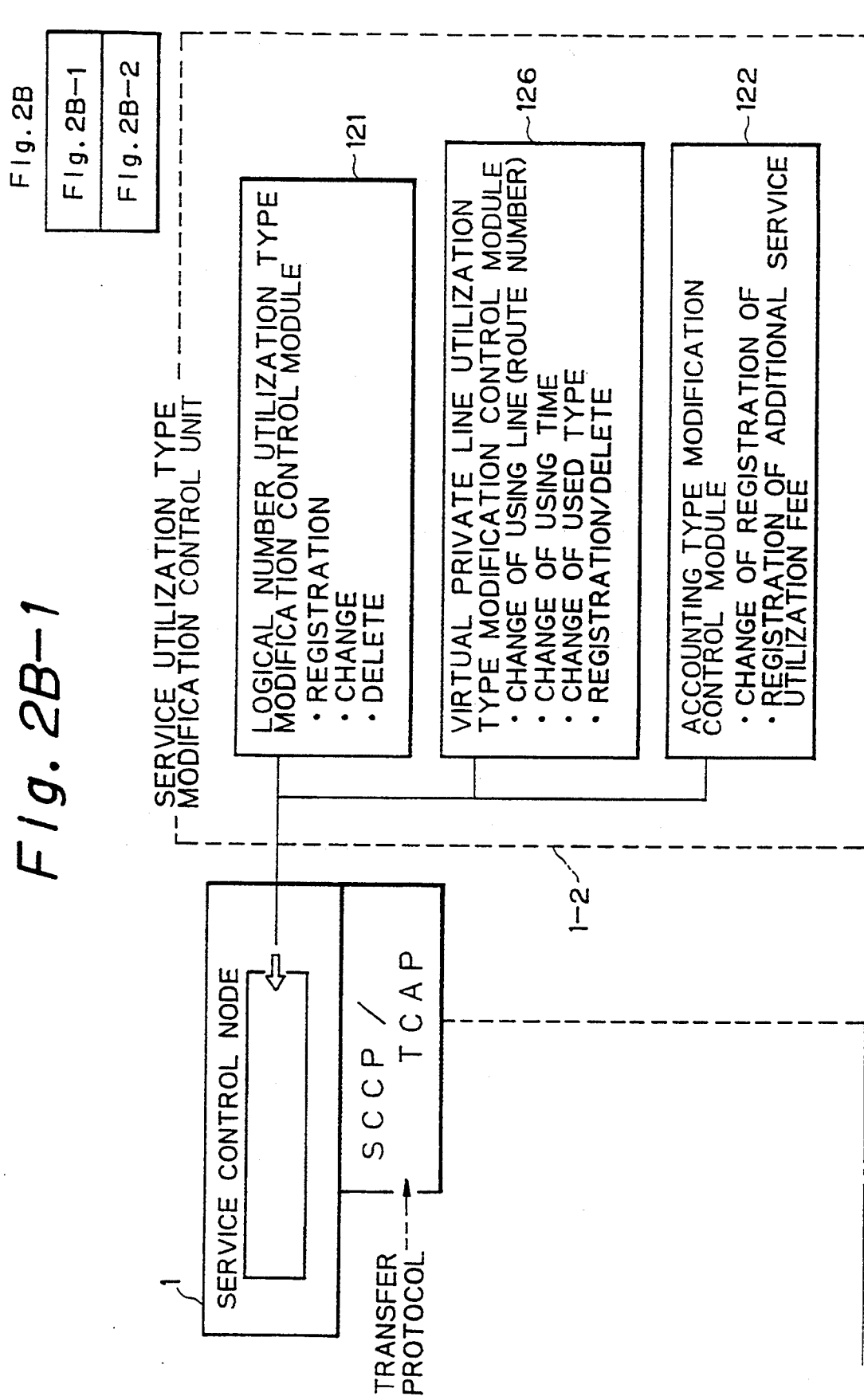

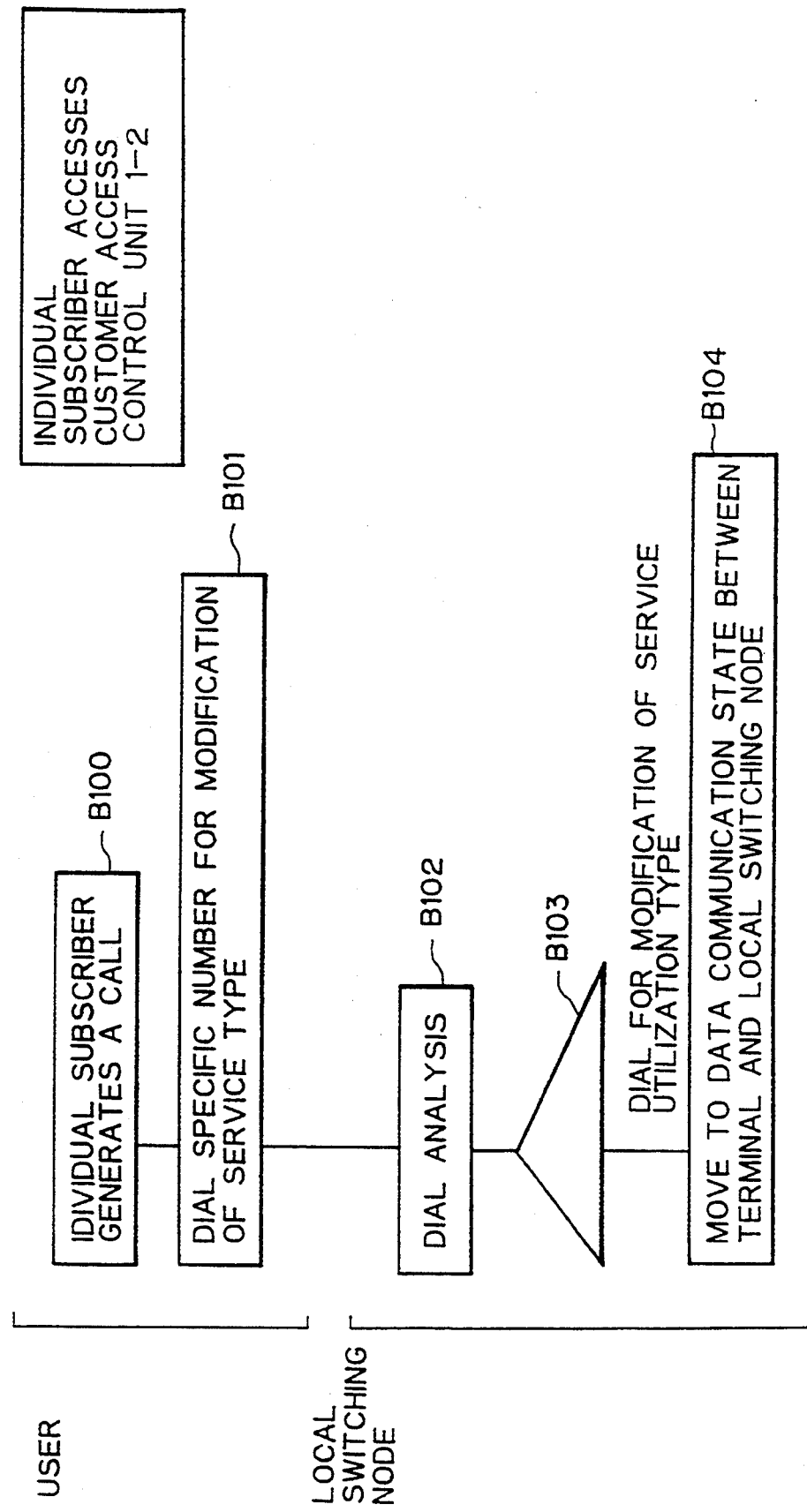

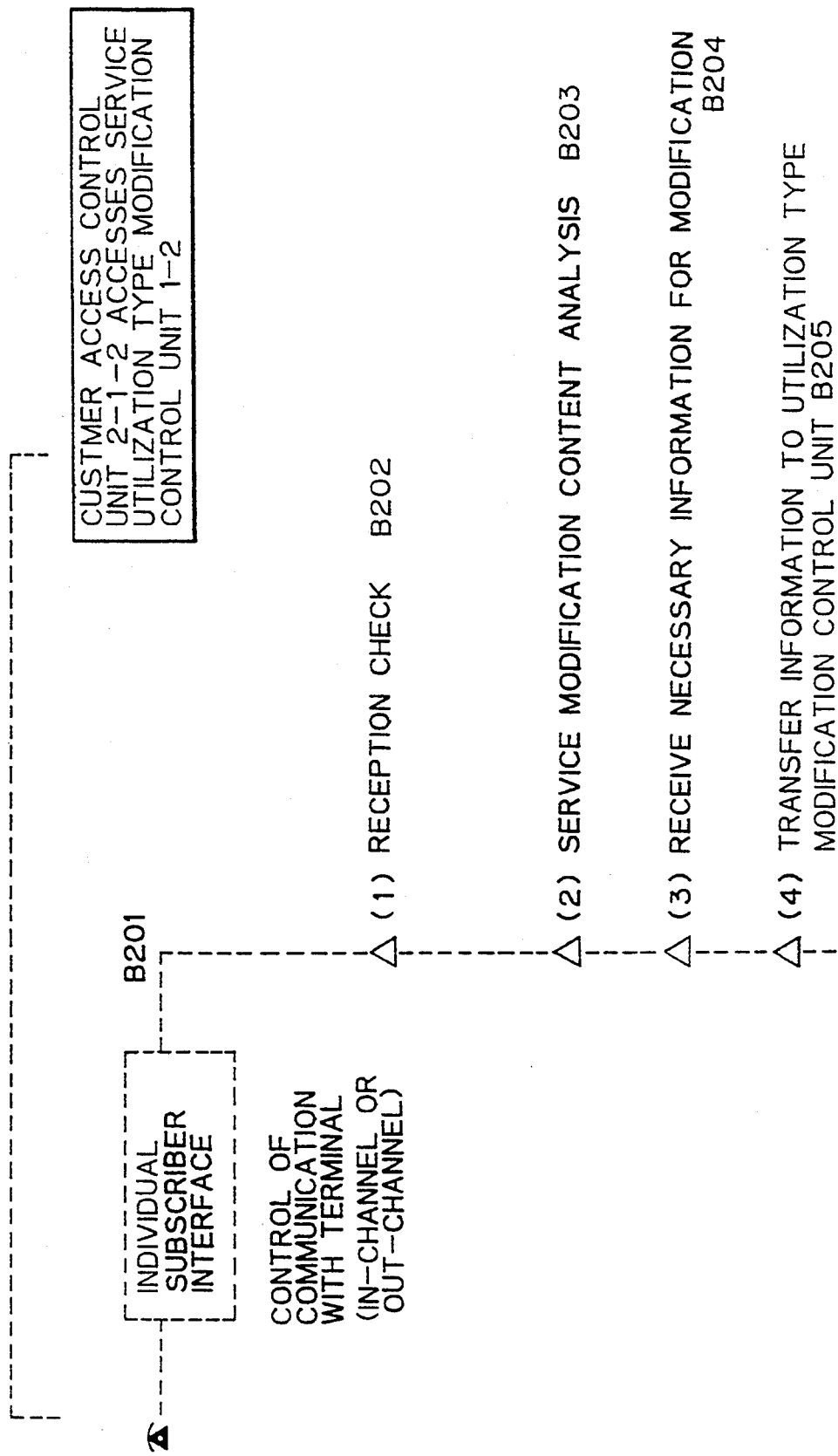

Fig. 10B

| Fig.10B-1 |
|---|
| Fig.10B-2 |
| Fig.10B-3 |

Fig. 10B-1

CHECK BY THE MODIFICATION CONTROL UNIT 1-2

COMMUNICATION CONTROL FOR COMMUNICATION WITH CUSTOMER ACCESSING UNIT 2-1-2 IN LOCAL SWITCHING NODE 2 — B302

INITIATE COMMUNICATION

B303 △ (1) SECURITY CHECK

COMMUNICATION CONDITION CONTROL FOR COMMUNICATION WITH SERVICE CONTROL NODE 1 — B301

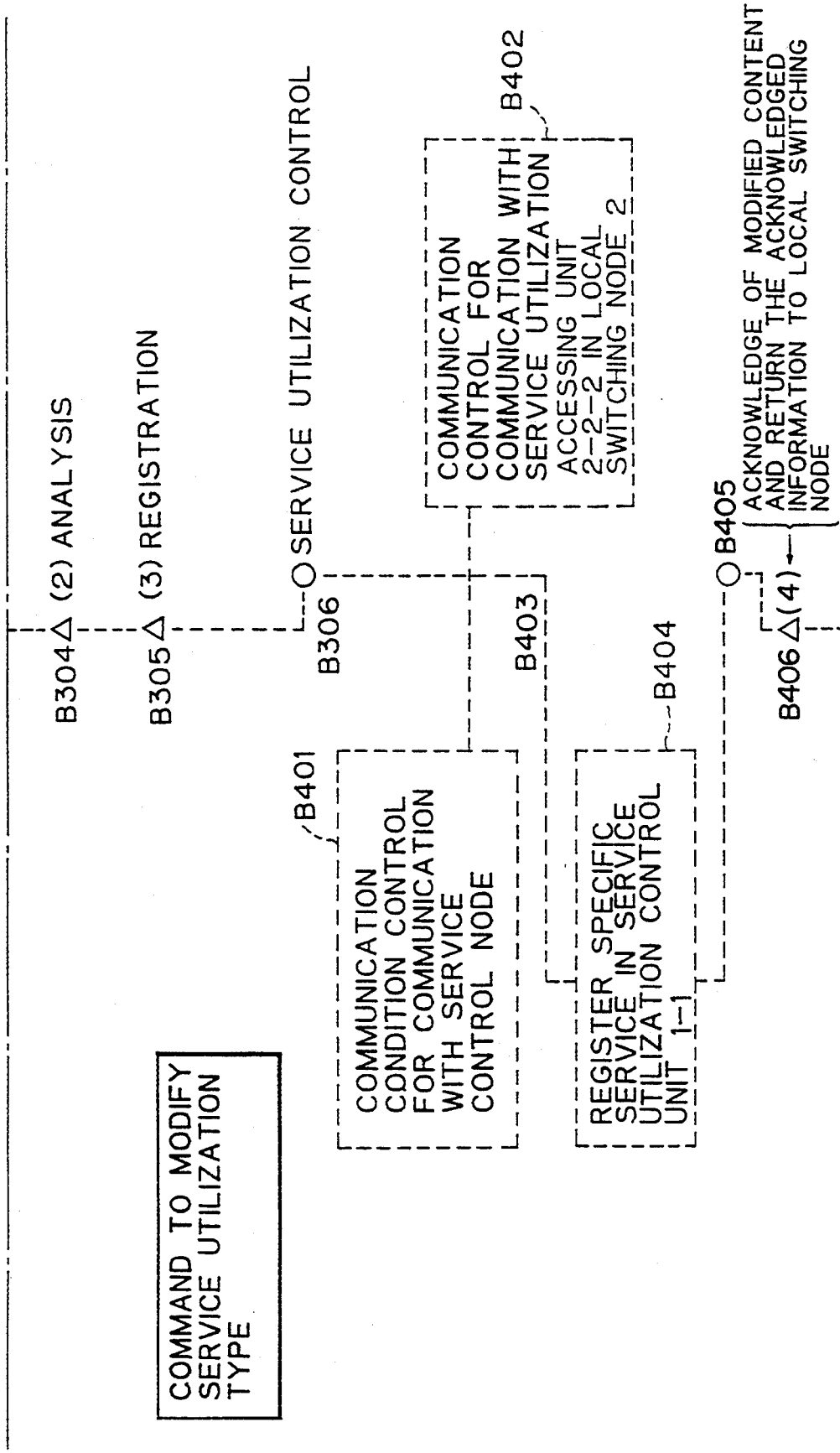

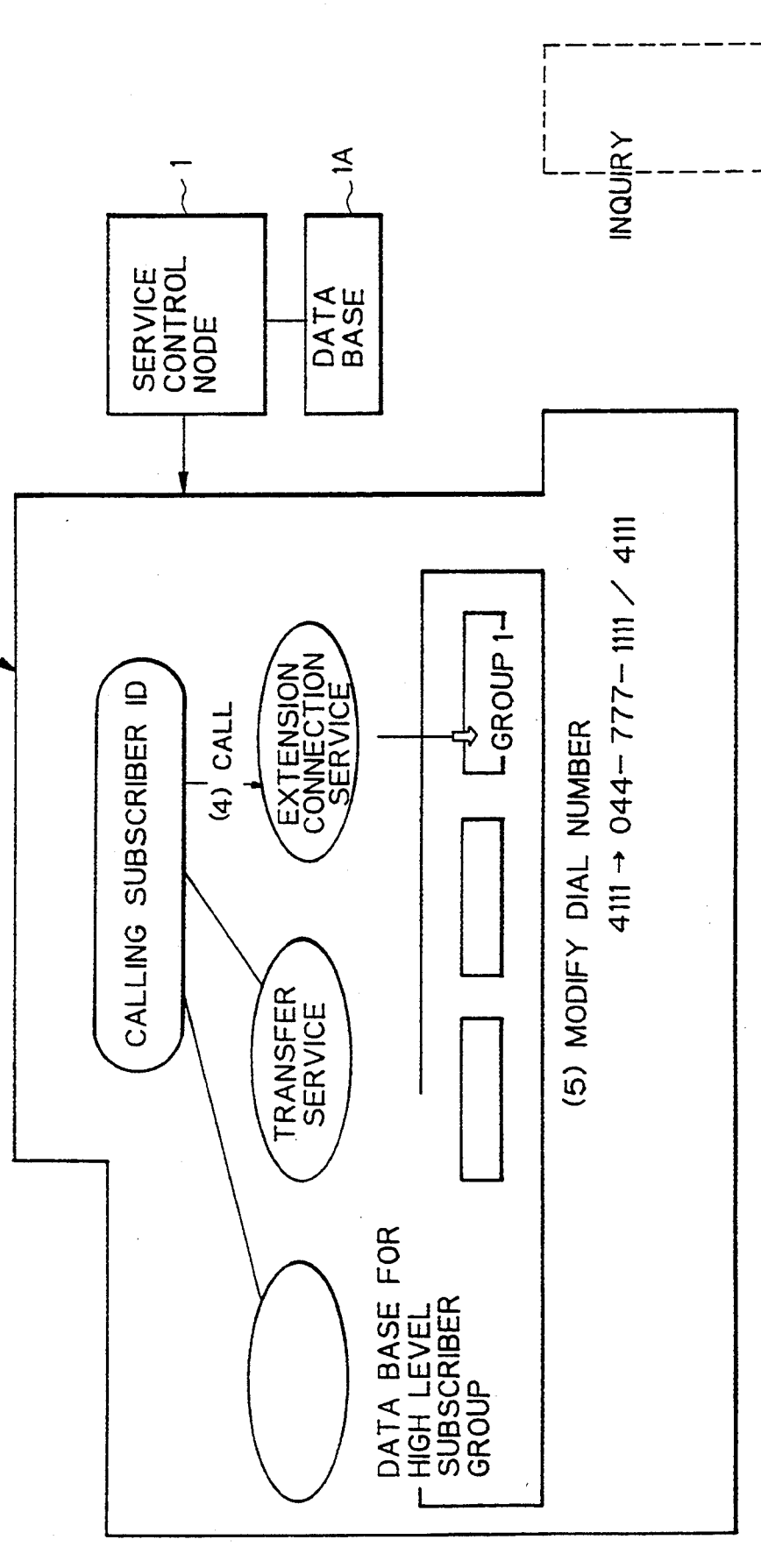

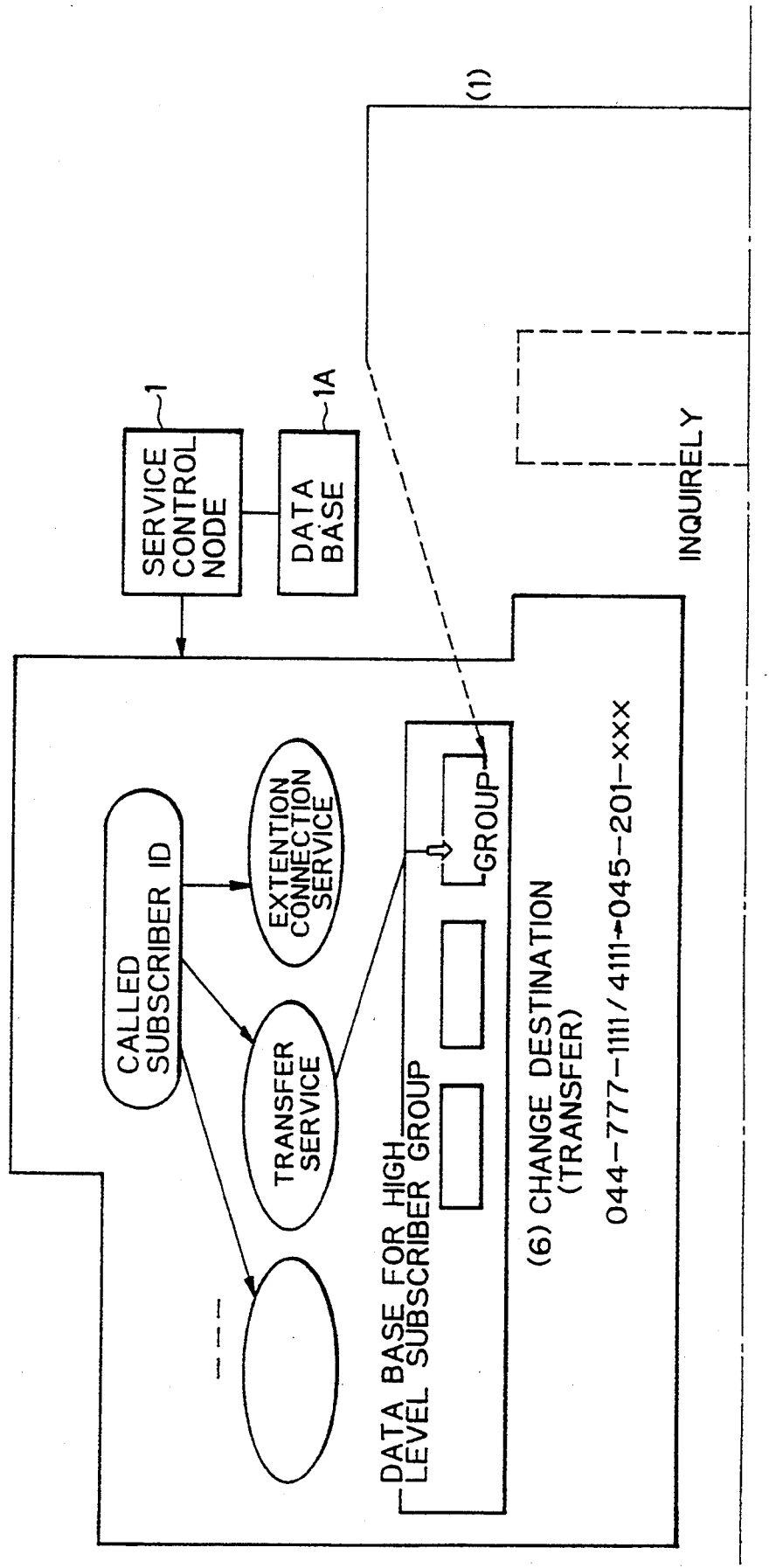

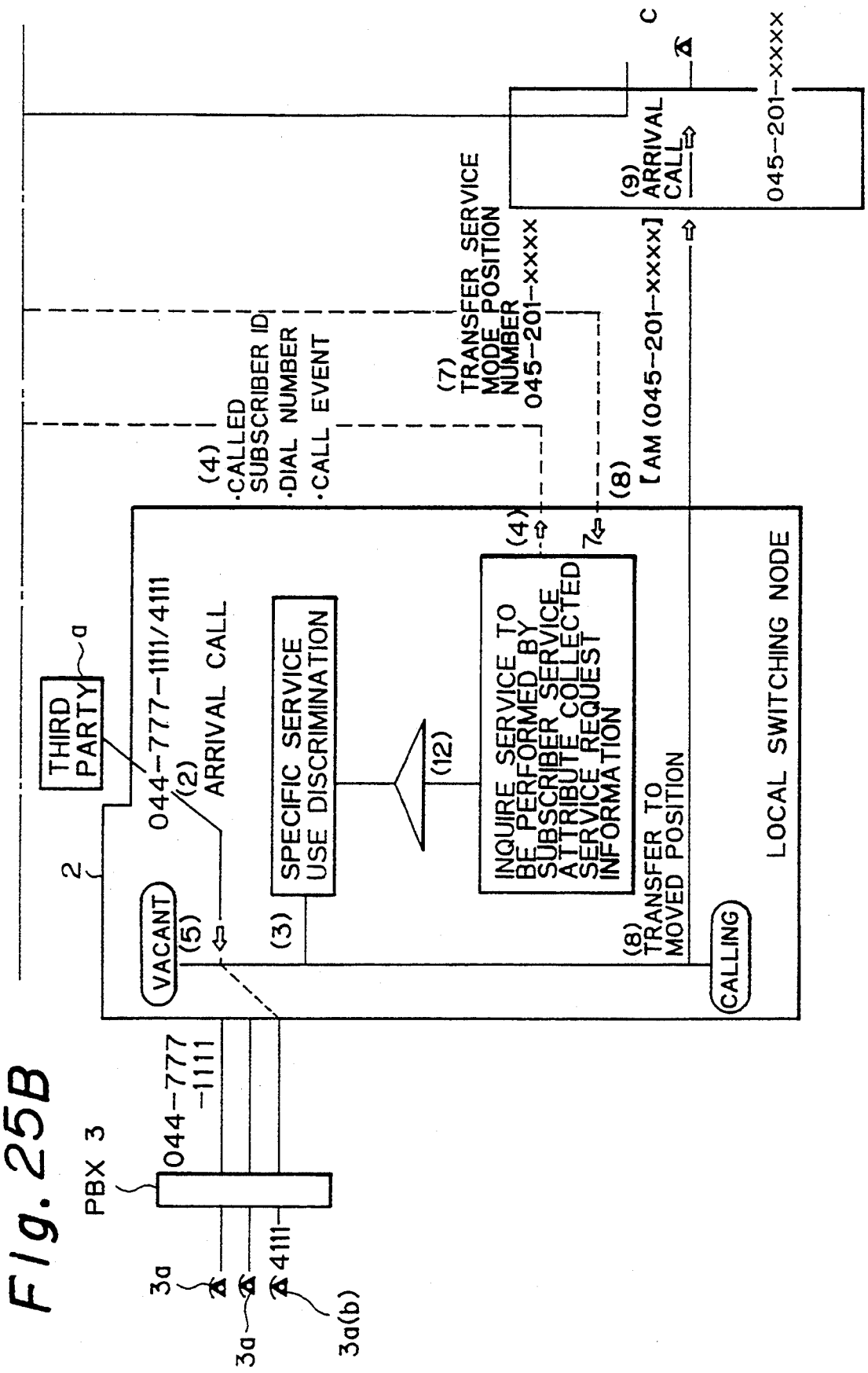

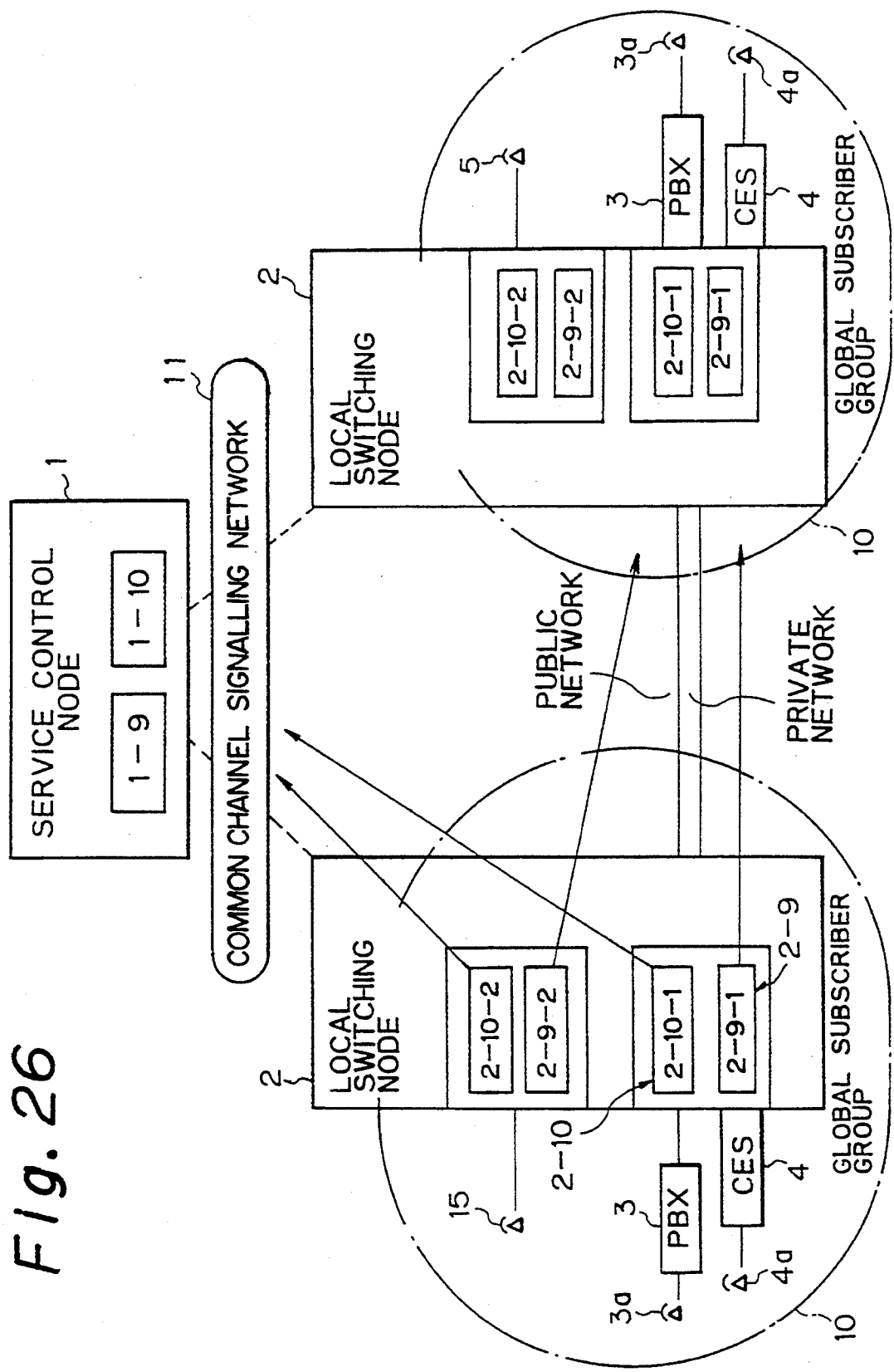

GLOBAL SUBSCRIBER GROUP SERVICE SYSTEM

BACKGROUND OF THE INVENTION (1) Field of the Invention

The present invention relates to a global subscriber group service system for providing various services for a global subscriber group.

(2) Description of the Related Art

In recent years, services for a global subscriber group have become available in public telephone networks for providing predetermined types of special services for specific subscribers in the global subscriber group. The predetermined types of special services are, for example, a service for using a virtual private network or a service for using an extension number to connect the subscribers in the global subscriber group. Such services mentioned above are hereinafter referred to as global subscriber group services.

In the prior art, the subscribers who can enjoy the global subscriber services are limited to subscribers in the global subscriber group, such as subscribers accommodated to a private branch exchange (PBX) or a centralized exchanging switch (CES). In the following discussion, the subscribers that are accommodated to PBX or CES are occasionally referred to as "group subscribers" or PBX/CES subscribers.

In general, the conventional service providing system for a global subscriber group includes a plurality of local switching nodes each for accommodating individual subscribers and PBX/CES subscribers and a service control node that carries out a centralized control of the local switching nodes. The local switching nodes are mutually connected through a public network, virtual private network, or private lines, as later described in more detail with reference to the drawings.

Conventionally, only specific PBX/CES subscribers can use the global subscriber group services, by previously registering entry into the global subscriber group service network through a maintenance person.

In practice, to enjoy the service for utilization of the virtual private network, conventionally, the type of utilization including various items of, for example, the corresponding relationship between the calling subscriber and the receiving subscriber, the numbers of the subscribers, the communication route, time schedule, etc., has to be registered by a maintenance person.

Further, to enjoy the services of a global extension number connection service, conventionally, an actual terminating terminal (physical number) corresponding to a global extension close number (logical number) has to be registered in the network through a maintenance person to provide the service for specific group subscribers. In addition, modification of a registered terminal and the type of services is not possible even for specific subscribers belonging to the global subscriber group.

As mentioned above, in the conventional global subscriber group service, the subscriber group services have been realized only for specific PBX/CES subscribers. Furthermore, a global subscriber group service modification function, which allows the subscriber to flexibly modify registered types for various services to be used, is not available. Therefore, in the prior art, only less flexible and less responsive global subscriber group services can be provided.

On the other hand, in the extension close number connection service for global PBX/CES subscribers, there is a problem in the prior art that the subscriber who uses the global extension number connection service, is limited to the PBX/CES subscribers previously registered in the network. Also, a problem is encountered in the prior art in that a flexible control function including a capability or permitting individual subscribers to use this type of service, is not available.

Furthermore, in the conventional service providing part of the public network as the virtual private network, the subscribers who can use the virtual private network are limited only to the PBX/CES subscribers previously registered in the network. Therefore, in the prior art, a flexible control function permitting any customer to modify the type of registered services of the virtual private network is not available.

In recent years, it has been desired to provide such type of global subscriber group services including use of a virtual private network or service for assigning individual subscribers as terminals in a virtual extension system (including a service for connection to an internal closed number), with respect to a high level global subscriber group including not only PBX or CES subscribers but also individual subscribers.

SUMMARY OF THE INVENTION

The present invention is to solve these problems. Therefore, it is an object of the present invention to provide a global subscriber group service system that permits the global subscriber group services including use of a virtual private network or service of virtual global extension system, including an extension close number connection service and so forth, to be used not only by group subscribers, but, also by independent subscribers or other subscriber groups, and enables any customer to modify the use type of the global subscriber group services.

To attain the above object, there is provided, according to one aspect of the invention, a global subscriber group service system comprising a service control node for effecting a centralized control of services of a network of a global subscriber group including local switching nodes. The service control node includes a global subscriber group service control unit for controlling the utilization of services for the global subscriber group, and a global subscriber group service utilization type modification unit for modifying use types of services for the global subscriber group. Each of the local switching nodes includes a global subscriber group service utilization access control unit for enabling the utilization of services for the global subscriber group by being accessed by the global subscriber group utilization control unit in the service control node, and a customer access control unit for accessing the global subscriber group service utilization type modification unit in the service control node in response to a request from a subscriber accommodated by the local switching node in question.

By the above construction, utilization of a service for the global subscriber group is possible by accessing the global subscriber group service utilization access control unit in the local switching node from the global subscriber group service utilization control unit in the service control node. Modification of a utilization type of service for the global subscriber group is possible by accessing the global subscriber group service utilization type modification unit in the service control node through the customer access control unit from a subscriber accommodated by the local switching node.

In the above construction, each of the global subscriber group service control unit, the global subscriber group service utilization type modification unit, the global subscriber group service utilization access control unit, and the customer access control unit comprises a processor and a data base connected to the processor. The data base stores the service types to be utilized.

In the above construction, the local switching node is connected to at least one of either a private exchange or a centralized exchange switch or both for accommodating group subscribers. The local switching node further accommodates individual subscribers. The global subscriber group service utilization access control unit comprises a unit for group subscribers accommodated by at least one of the private branch exchanges and the centralized exchange switch, and further comprises a unit for individual subscribers. The customer access control unit comprises a unit for group subscribers, and further comprises a unit for individual subscribers.

According to another aspect of the present invention, there is provided a global subscriber group service system comprising a service control node for effecting centralized control of services of a network of a global subscriber group including local switching nodes. The service control node includes a virtual private network utilization control unit for controlling utilization of a virtual private network for the global subscriber group. The service control node also comprises a virtual private network utilization type modification unit for modifying the utilization types of the virtual private network for the global subscriber group. Each of the local switching nodes includes a virtual private network utilization access control unit for enabling the utilization of the virtual private network for the global subscriber group by being accessed by the virtual private network utilization control unit in the service control node; and a customer access control unit for accessing the virtual private network utilization type modification unit in the service control node in response to a request from a subscriber accommodated to the local switching node in question. Utilization of the virtual private network for the global subscriber group being enabled is accomplished by accessing the virtual private network utilization access control unit in the local switching node from the virtual private network utilization control unit in the service control node. Modification of a utilization type of virtual private network for the global subscriber group is possible by accessing the virtual private network utilization type modification unit in the service control node through the customer access control unit from a subscriber accommodated to the local switching node.

The local switching node is connected to at least one of either a private exchange or a centralized exchange switch or both for accommodating group subscribers. The local switching node further accommodates individual subscribers. The virtual private network utilization access control unit comprises a unit for group subscribers accommodated by at least one of the private branch exchanges and the centralized exchange switch, and further comprises a unit for individual subscribers. The customer access control unit comprises a unit for group subscribers, and further comprises a unit for individual subscribers.

According to still another aspect of the present invention, there is provided a global subscriber group service system comprising a service control node for effecting a centralized control of services of a network of a global subscriber group including local switching nodes. The service control node includes a global extension number management control unit for controlling the management of extension numbers for the global subscriber group. The service control node also comprises a global extension number management type modification unit for modifying the management types of extension numbers for the global subscriber group. Each of the local switching nodes including a global extension number connection utilization access control unit for enabling the management of extension numbers for the global subscriber group by being accessed by the global extension number management control unit in the service control node. Each of the local switching nodes also includes a customer access control unit for accessing the global extension number management control type modification unit in the service control node in response by a request from a subscriber accommodated to the local switching node in question. Management of extension numbers for the global subscriber group is possible by accessing the global extension number connection utilization access control unit in the local switching node from the global extension number management control unit in the service control node. Modification of management of extension numbers for the global subscriber group is possible by accessing the global extension number management type modification unit in the service control node through the customer access control unit from a subscriber accommodated to the local switching node.

In the above construction, the local switching node is connected to at least one of either a private exchange or a centralized exchange switch or both for accommodating group subscribers, and the local switching node further accommodates individual subscribers. The global extension number connection utilization access control unit comprises a unit for the group subscribers accommodated by at least one of the private branch exchanges and the centralized exchange switch, and further comprises a unit for the individual subscribers. The customer access control unit comprises a unit for the group subscribers, and further comprises a unit for the individual subscribers.

According to another aspect of the present invention, there is provided a global subscriber group service system comprising a service control node for effecting a centralized control of services of a network of a global subscriber group including local switching nodes. The service control node includes a global subscriber group service control unit for controlling the utilization of services for the global subscriber group. The service control node also comprises a global subscriber group extension control unit for controlling the making of an extension for the global subscriber group. Each of the local switching nodes includes a global subscriber group service utilization access control unit for enabling the utilization of services for the global subscriber group by being accessed by the global subscriber group utilization control unit in the service control node, and a global subscriber group extension service registering customer access control unit for accessing the global subscriber group extension control unit in the service control node in response to a request from a subscriber accommodated to the local switching node in question.

Utilization of a service for the global subscriber group is possible by accessing the global subscriber group service utilization access control unit in the local switching node from the global subscriber group service utilization control unit in the service control node. Rendering a subscriber an extension of the global subscriber group is possible by accessing the global subscriber group extension control unit in the service control node through the global subscriber group service utilization access control unit from a subscriber accommodated to the local switching node.

In the above construction, the local switching node is connected to at least either a private exchange or a centralized exchange switch or both for accommodating group subscribers, and the local switching node further accommodates individual subscribers. The global subscriber group service utilization access control unit comprises a unit for group subscribers accommodated by at least one of the private branch exchanges and the centralized exchange switch, and further comprises a unit for individual subscribers. The global subscriber group extension service registering customer access control unit comprises a unit for group subscribers, and further comprises a unit for individual subscribers.

According to still further aspect of the present invention, there is provided a global subscriber group service system comprising a service control node for effecting a centralized control of services of a network of a global subscriber group including local switching nodes. The service control node includes a global subscriber group service control unit for controlling the utilization of services for the global subscriber group. The service control node also comprises a global subscriber group extension control unit for controlling the production of an extension for the global subscriber group. Each of the local switching nodes includes a global subscriber group service utilization access control unit for enabling the utilization of services for the global subscriber group by being accessed by the global subscriber group utilization control unit in the service control node. Each local switching node also comprises a global subscriber group extension service registering customer access control unit for accessing the global subscriber group extension control unit in the service control node in response to a request from a subscriber accommodated to the local switching node in question. Utilization of a service for the global subscriber group is possible by accessing the global subscriber group service utilization access control unit in the local switching node from the global subscriber group service utilization control unit in the service control node. Rendering a subscriber an extension of the global subscriber group is possible by accessing the global subscriber group extension control unit in the service control node through the global subscriber group service utilization access control unit from a subscriber accommodated to the local switching node.

In the above construction, the local switching node is connected to at least either a private exchange or a centralized exchange switch or both for accommodating group subscribers, and the local switching node further accommodates individual subscribers. The global subscriber group service utilization access control unit comprises a unit for group subscribers accommodated to at least one of the private branch exchanges and the centralized exchange switch, and further comprises a unit for the individual subscribers. The global subscriber group extension service registering customer access control unit comprises a unit for group subscribers, and further comprises a unit for individual subscribers.

According to still another aspect of the present invention, there is provided a global subscriber group service system comprising a service control node for effecting a centralized control of services of a network of a plurality of global subscriber groups each including local switching nodes. The service control node includes a global subscriber group management and operation control unit for controlling the utilization of services for the global subscriber group. The service control node also comprises a global subscriber group service utilization type modification unit for modifying use types of services for the global subscriber group. Each of the local switching nodes in each of the global subscriber groups includes a global subscriber group service utilization access control unit for enabling the utilization of services for the global subscriber group accommodated by the local switching node in question by being accessed by the global subscriber group utilization control unit in the service control node, and a customer access control unit for accessing the global subscriber group service utilization type modification unit in the service control node in response to a request from a subscriber accommodated to the local switching node in question. Utilization of a service for the global subscriber group accommodated to the local switching node in question is possible by accessing the global subscriber group service utilization access control unit in the local switching node from the global subscriber group management and operation control unit in the service control node. Modification of a utilization type of a service for the global subscriber group accommodated to the local switching node in question is possible by accessing the global subscriber group service utilization type modification unit in the service control node through the customer access control unit from a subscriber accommodated to the local switching node.

In the above construction, the local switching node is connected to at least one of either a private exchange or a centralized exchange switch or both for accommodating group subscribers, and the local switching node further accommodates individual subscribers. The global subscriber group service utilization access control unit comprises a unit for group subscribers accommodated by at least one of the private branch exchanges and the centralized exchange switch, and further comprises a unit for individual subscribers. The customer access control unit comprises a unit for the group subscribers, and further comprises a unit for the individual subscribers.

BRIEF DESCRIPTION OF THE DRAWINGS

The present invention will be more fully understood from the detailed description of the preferred embodiments with reference to the accompanying drawings, wherein:

FIG. 2B, FIG. 2B-1 and FIG. 2B-2, are explanatory block diagrams showing an example of the construction of the service utilization type modification unit 1-2 in the global subscriber group service system shown in FIG. 1;

FIGS. 10A and 10B, comprised of FIGS. 10A-1, 10A-2, 10B-1, 10B-2, and 10B-3 are flow diagrams explaining in detail the operation when an individual subscriber registered in the global subscriber group requires the modification of the type of the utilized service in the global subscriber group service system according to the first embodiment of the present invention;

FIG. 25, comprised of FIG. 25A and FIG. 25B are schematic block diagrams explaining the manner of transferring an arriving call to a moved destination for a PBX extension number according to the fourth embodiment of the present invention;

FIG. 26 is a schematic block diagram showing a global subscriber group service system explaining a function for service over a plurality of global subscriber groups, according to the fifth embodiment of the present invention;

DESCRIPTION OF THE PREFERRED EMBODIMENT

Figure 1:
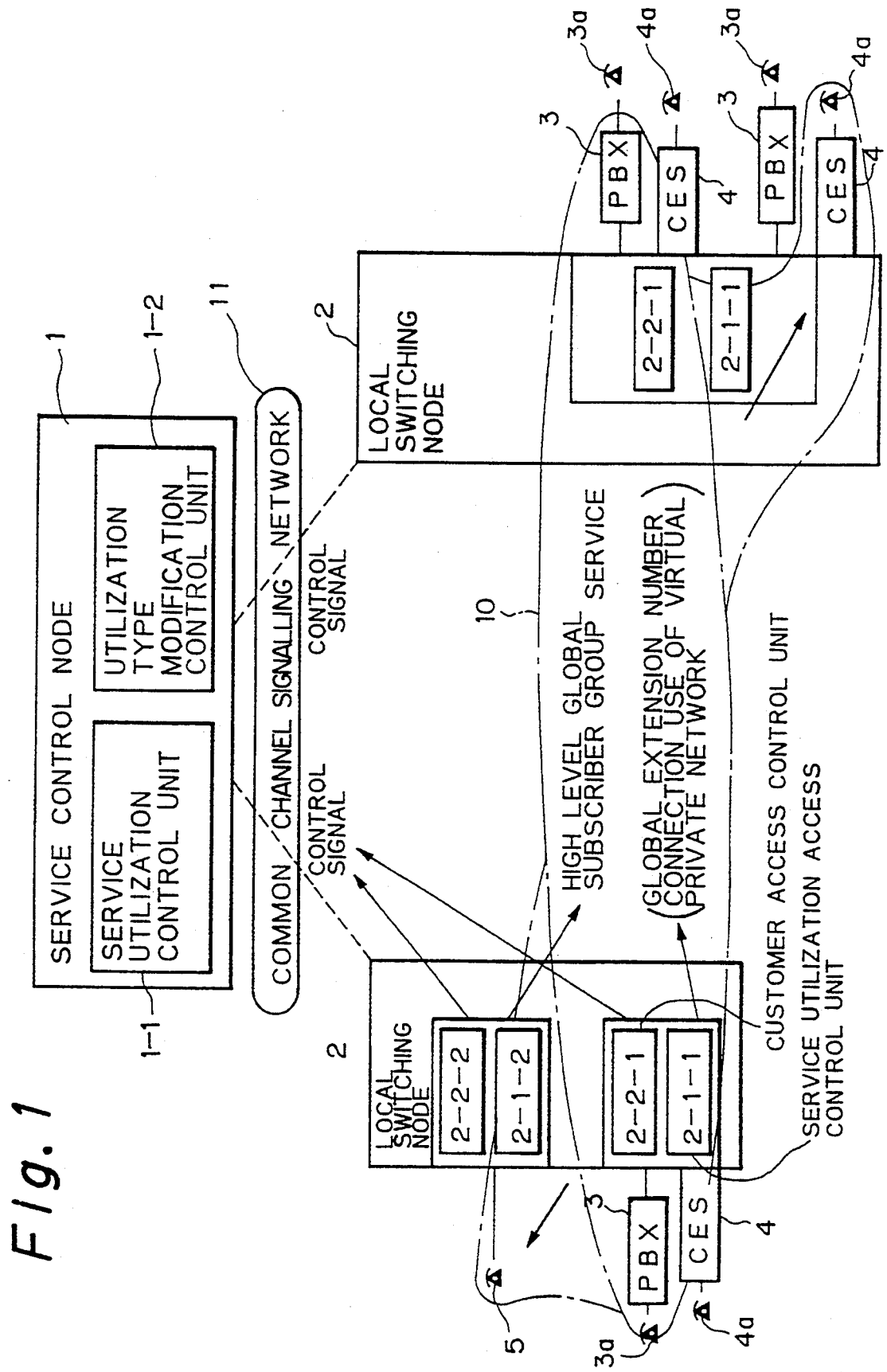
FIG. 1 is a schematic block diagram of the preferred embodiment of a global subscriber group service system according to a first embodiment of the present invention.

FIG. 1 is a block diagram showing a global subscriber group service system, according to a first embodiment of the present invention. In FIG. 1, the system includes a service control node 1 and two or more local switching nodes 2. Each of the local switching nodes 2 accommodates a plurality of subscribers, including PBX subscribers 3a, CES subscribers 4a, and individual subscribers 5. The local switching nodes 2 are connected through a common channel signalling network 11 to the service control node 1 to form a global subscriber group 10 that can enjoy predetermined special services. The service control node 1 performs concentric control of services for the global subscriber group 10.

To enable to the use of the predetermined special services for the global subscriber group and general subscribers such as individual subscribers or another subscriber group, according to the first embodiment of the present invention, the service control node 1 is provided with a service utilization control unit 1-1 (hereinafter referred to as an utilization control unit 1-1) and a service utilization type modification control unit 1-2 (hereinafter referred to as a modification control unit 1-2). The utilization control unit 1-1 and the modification control unit 1-2 are constructed by one or more processors and data bases, which are not shown in the figure.

The utilization control unit 1-1 controls the use of services for the global subscriber group through communication between the service control node 1 and the local switching node 2. The modification control unit 1-2 modifies the types of services to be utilized through communication between the service control node 1 and the local switching node 2. Before modifying the types, the modification control unit 1-2 stores, in its data base, information associated with respective subscribers, i.e., PBX subscribers 3a, CES subscribers 4a, and individual subscribers 5. The information includes types of services to be provided for respective subscribers.

On the other hand, in each of the local switching nodes 2, there are provided a service utilization access control unit 2-1-1 and a customer access control unit 2-2-1 for the global group subscribers. In this embodiment, the local switching node 2 accommodates individual subscribers 5, in addition to the private branch exchanges 3 and the centralized exchange switches 4 for a subscriber group of the PBX/CES subscribers 3a and 4a. Therefore, the local switching node 2 further includes a service utilization access control unit 2-1-2 and a customer access control unit 2-2-2 for individual subscribers 5.

The utilization access control unit 2-1-1 or 2-1-2 is constructed by a processor and a memory. Also, the customer access control unit 2-2-1 or 2-2-1 is constructed by a processor and a memory. The utilization access control unit 2-1-1 or 2-1-2 enables the associated subscriber to use the global subscriber group services through the service utilization control unit 1-1 in the service control node 1. The customer access control unit 2-2-1 or 2-2-2 enables the associated subscriber to register a new type of service or to modify the registered type of services for the global subscriber group by accessing the modification control unit 1-2 in the service control node 1.

To enable the PBX subscribers 3a and the CES subscribers 4a to enjoy the registered global subscriber group services, the utilization access control unit 2-1-1 is used to access the utilization control unit 1-1 in the service control node 1. Also, to enable the individual subscriber to enjoy the registered global subscriber group services, the utilization access control unit 2-1-2 is used to access the utilization control unit 1-1 in the service control node 1. The utilization access control unit 2-1-1 will be hereafter referred to as a "PBX/CES access control unit", and the utilization access control unit 2-1-2 for the individual subscribers 5 will be hereafter referred to as an "individual subscriber utilization access control unit".

The customer access control unit 2-2-1 for the PBX/CES subscriber 3a or 4a will be hereafter referred to as a "PBX/CES customer access control unit", and the customer access control unit 2-2-2 for individual subscribers will be hereafter referred to as an "individual subscriber customer access control unit".

It should be noted that the service control node 1 and the respective local switching nodes 2 are connected through the common channel signalling network or a communicating path. On the other hand, the local switching nodes 2 are mutually connected through a public network, virtual private network, or private lines.

With the construction set forth above, the global subscriber group service system according to the first embodiment of the present invention, offers various special services for the subscribers. For illustrative purposes, some of the functions provided for the global subscriber group service system according to the first embodiment of the present invention will be discussed in the following.

Figure 2A:
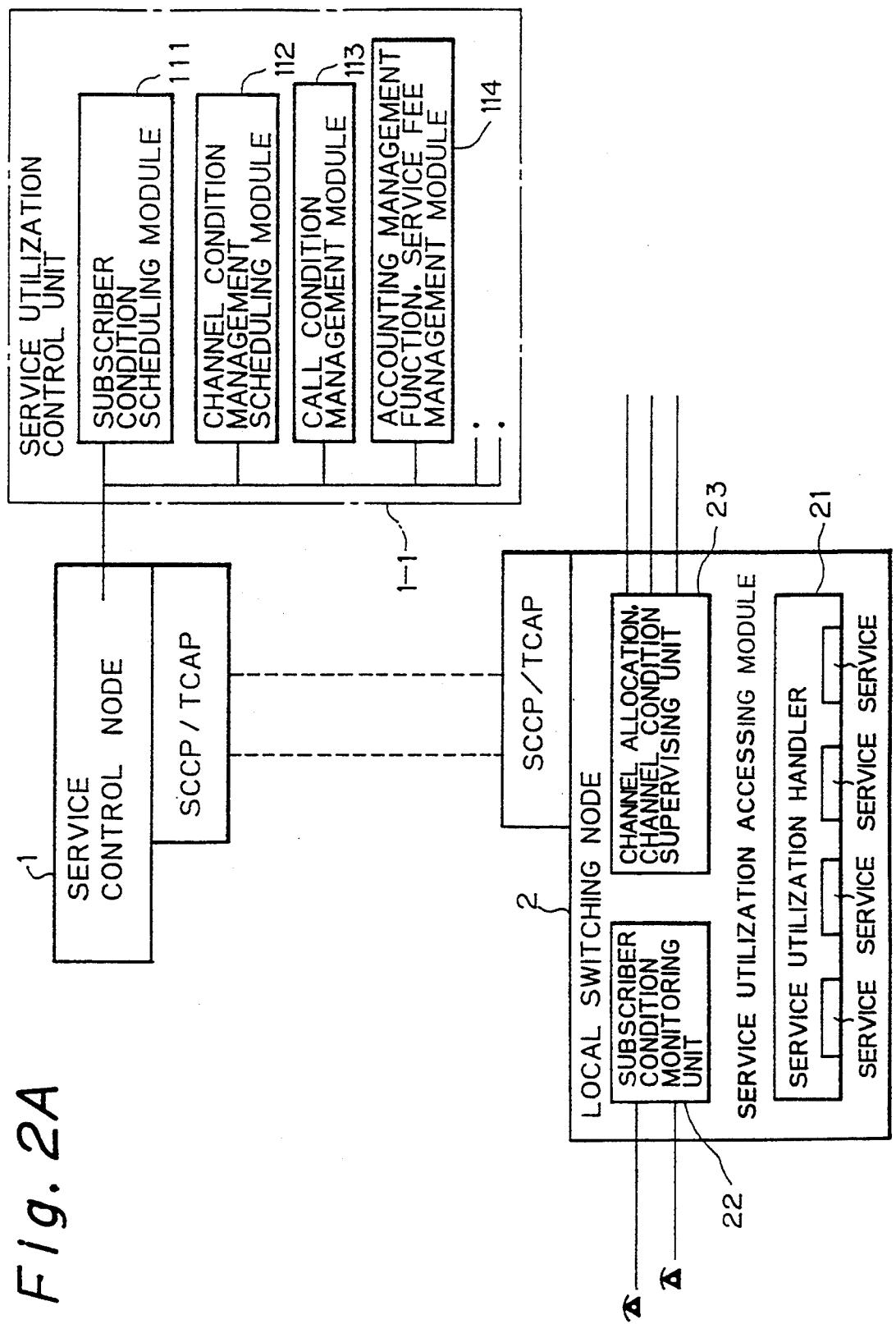
FIG. 2A is an explanatory block diagram showing an example of the construction of the service utilization accessing unit 2-1-1 in the local switching node 1 and the service utilization control unit 1-1 in the service control node 1 in the global subscriber group service system shown in FIG. 1.

FIG. 2A shows an example of the utilization control unit 1-1 and the constitution of the utilization access control unit 2-1-1 in the local switching node 2 in detail.

As shown in FIG. 2A, in order to control the service function in the preferred embodiment of the global subscriber group service system, the utilization access control unit 2-1-1 or 2-1-2 in the local switching node 2 is realized by a service handlers 21. The utilization control unit 1-1 in the service control node 1 in this example includes a subscriber condition management scheduling module 111 corresponding to each logical number of a subscriber, a channel busy condition management scheduling module 112, a call condition management module 113, accounting management and a service fee management module 114 and so forth.

The local switching node 2 includes a subscriber condition monitoring unit 22 for receiving the service of the subscriber condition management scheduling from the module 111 to allocate a channel for the subscriber. The local switching node 2 also includes a channel allocation and channel condition supervising unit 23 for receiving the service from the channel condition management scheduling module 112. On the other hand, SCCP/TCAP are interfaces provided for the service control node 1 and the local switching node 2 for feeding and receiving a control signal.

Figures 2, 2B:
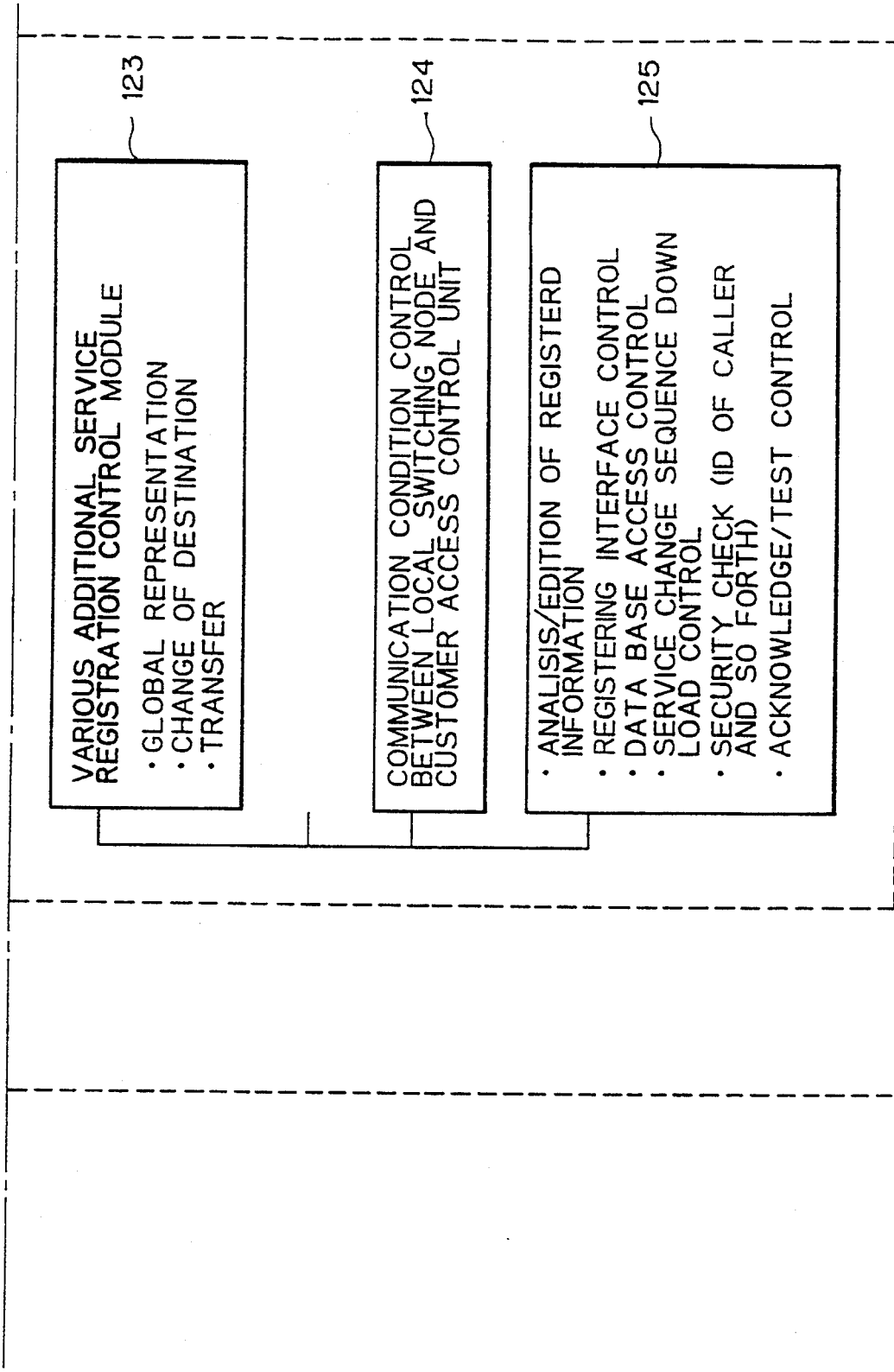

FIGS. 2B-1 and 2B-2 show an example of the constitution of the utilization type modification control unit 1-2. In the figures, the modification control unit 1-2 in the service control node 1 includes a logical number utilization type modification control module 121, an accounting type modification control module 122, various additional services registration control module 123, a communicating condition control module 124, and a security control module 125. The modification control unit 1-2 may further include a virtual private line utilization type modification control module 126, according to a second embodiment of the present invention, as later described in more detail.

The modification control module 121 acts to register, modify, and cancel a logical number corresponding to a subscriber. The accounting type modification control module 122 modifies management types such as the addresses of bills, the necessity of submission of details of the bills, the registration of additional service fees and so forth. The additional service registration control module 123 registers or modifies additional services, such as registering a global key number, modifying the destination of an arriving call, transferring an arriving call and so forth. The communication condition control module 124 controls communication with the customer access control unit 2-2 in the local switching node 2. The security control module 125 performs various functions including controlling the interface with the local switching node 2, security control, control of the data base, a control of an acknowledge and test, and so forth. For example, the security control module 125 performs an analysis and edits the registered information, registered interface control, data base accessing control, service type modification procedure down-loading control, security check (call ID and so forth), confirmation and testing control and so forth. The virtual private line utilization type modification control module 126, according to the second embodiment modifies the service to use the virtual private line, and in more detail, modifies the channels to be used by modifying the routes and the number, modifies the time to be used, modifies the types of services, registers a subscriber as a user for the virtual private line or cancels the subscriber from the virtual private line utilizing subscriber group.

Figure 3:
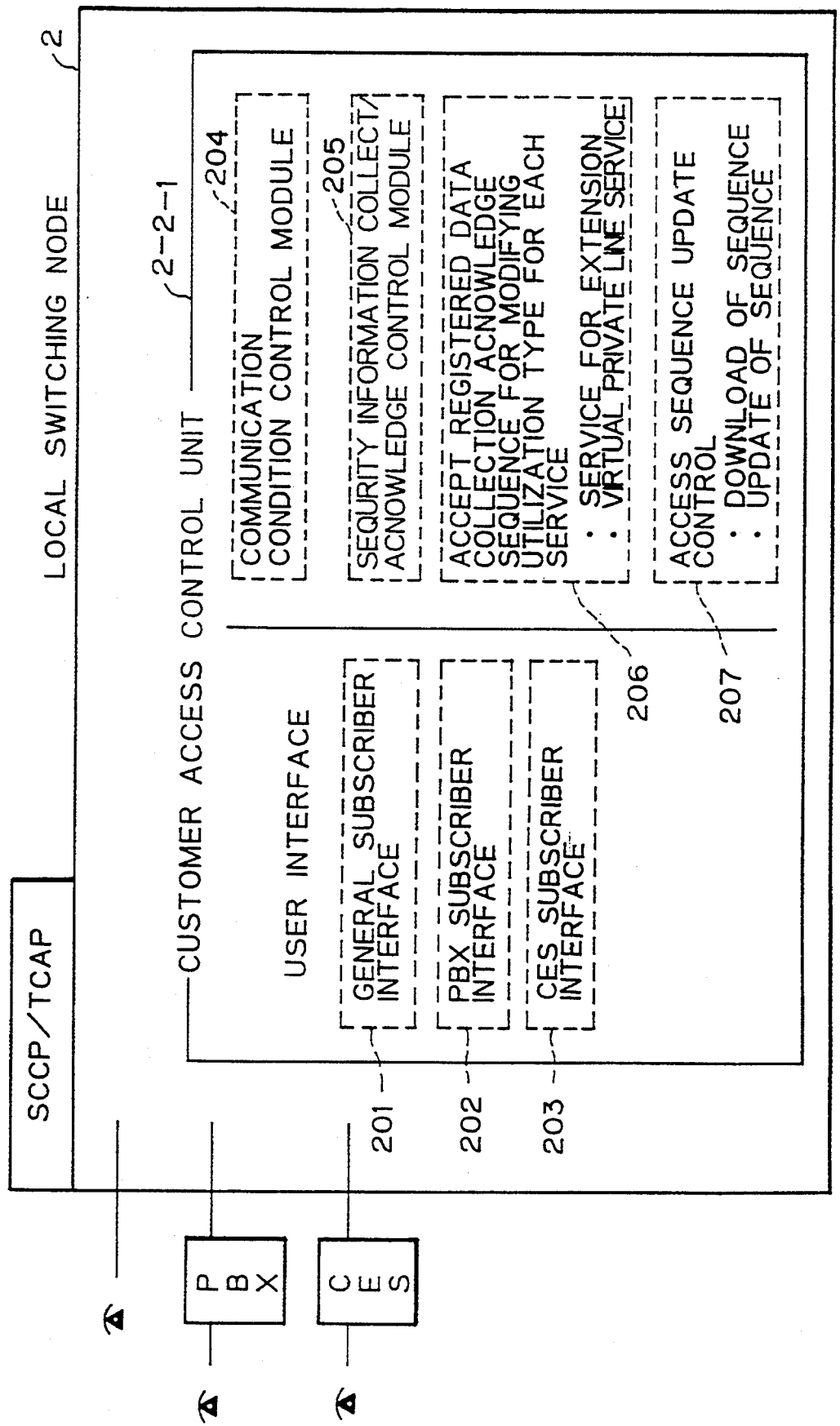
FIG. 3 is an explanatory partial block diagram showing an example of the construction of the customer access control unit 2-2-1 in the global subscriber group service system shown in FIG. 1.

FIG. 3 shows an example of the constitution of the customer access control unit 2-2-1 or 2-2-2. The units 2-2-1 and 2-2-2 have the same construction. Therefore, in the following, only the constitution of the customer access control unit 2-2-1 is described. In FIG. 3, the customer access control unit 2-2-1 in the local switching node 2 includes a user interface including an individual or general subscriber corresponding interface 201, a PBX subscriber corresponding interface 202, and a CES subscriber corresponding interface 203. Also, the customer access control unit 2-2-1 includes a communicating condition control module 204, a security control module 205, a service type registering module 206, and an access sequence update control module 207. The communicating condition control module 204 controls communication between the local switching node 2 and the service control node 1. The security control unit 205 controls collecting and acknowledging of security information. The service type registering module 206 modifies the types or services to be used by controling the sequence of acceptance of a request for modifying the type of services to be used, collection of registering data, and acknowledgement of these acceptance or collection, for providing, for example, a service making a subscriber as an extension terminal, or a service utilizing the virtual private line service. The access sequence update control module 207 controls the updating of the sequence of acceptance of the types of services to be used in accordance with an instruction from the service control node 1, by downloading the sequence or updating the sequence, for example.

With the construction set forth above, the global subscriber group service becomes available for not only the PBS/CES subscribers but also the individual subscribers in the global subscriber group 10. To use such services, the utilization access control unit 2-1-1 or 2-1-2 in the local switching node 2 is accessed by the utilization control unit 1-1 in the service control node 1. Also, the registered service types can be modified by any subscriber accommodated to the local switching unit 2 by accessing the utilization type modification control unit 1-2 in the service control node 1 through the customer access control unit 2-2-1 or 2-2-2.

The above-described first embodiment of the present invention will be further described in detail in various examples as follows.

As a first function to be realized by the first embodiment of the global subscriber group service system, discussion will be provided for a function permitting the subscriber, who does not belong to the global subscriber group, to access the global subscriber group service system and to be registered as a member of the global subscriber group or for modifying the registered types of services.

In the following, the operations of the modification of the utilization type, the registration, the cancellation of the register in accordance with the first embodiment of the present invention shown in FIG. 1 are described in more detail.

Figure 4:
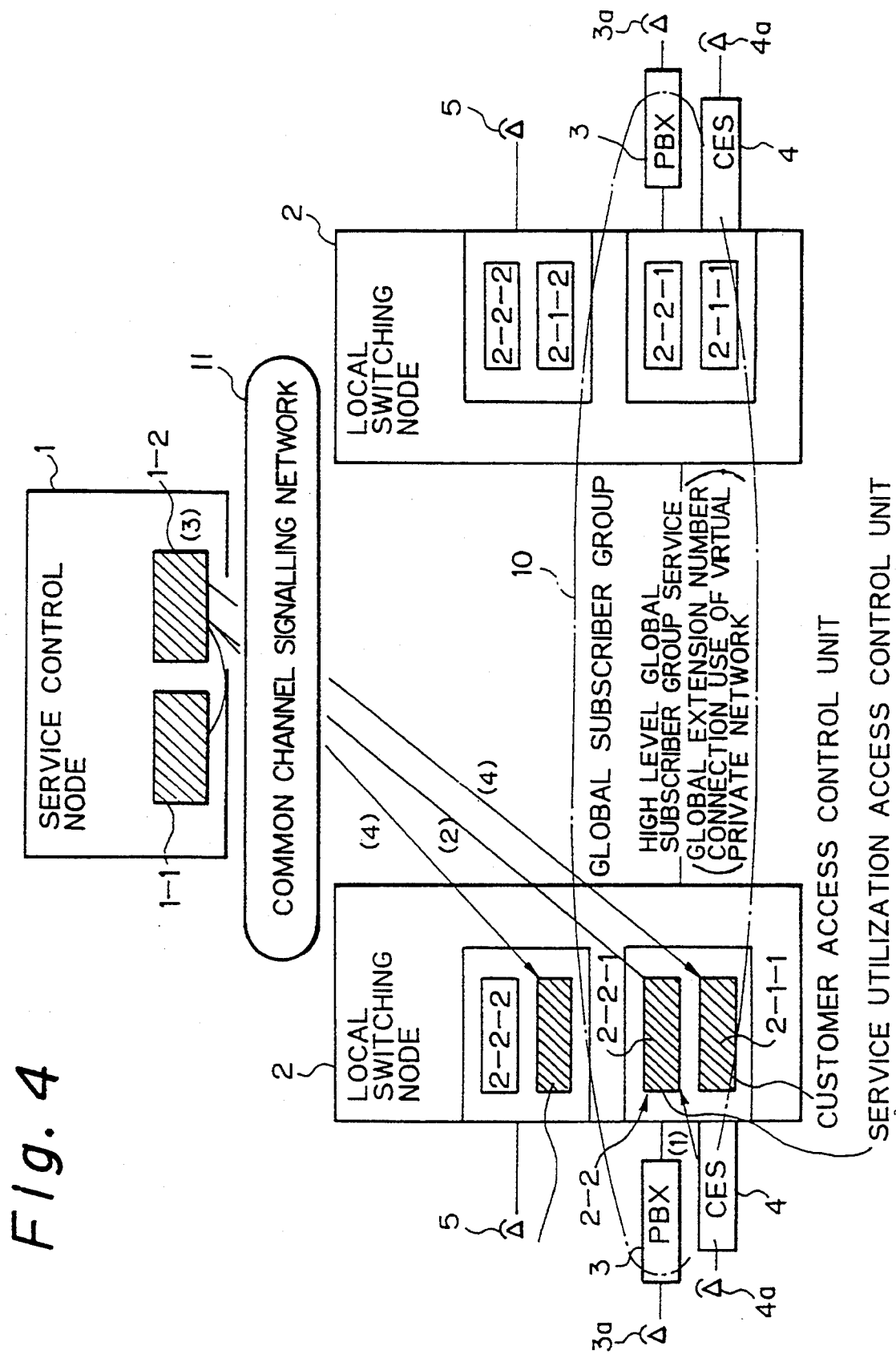
FIG. 4 is an explanatory and schematic block diagram of the global subscriber group service system for explaining the operation of a service when a PBX/CES subscriber requires a service, according to the first embodiment of the present invention.
Figure 5:
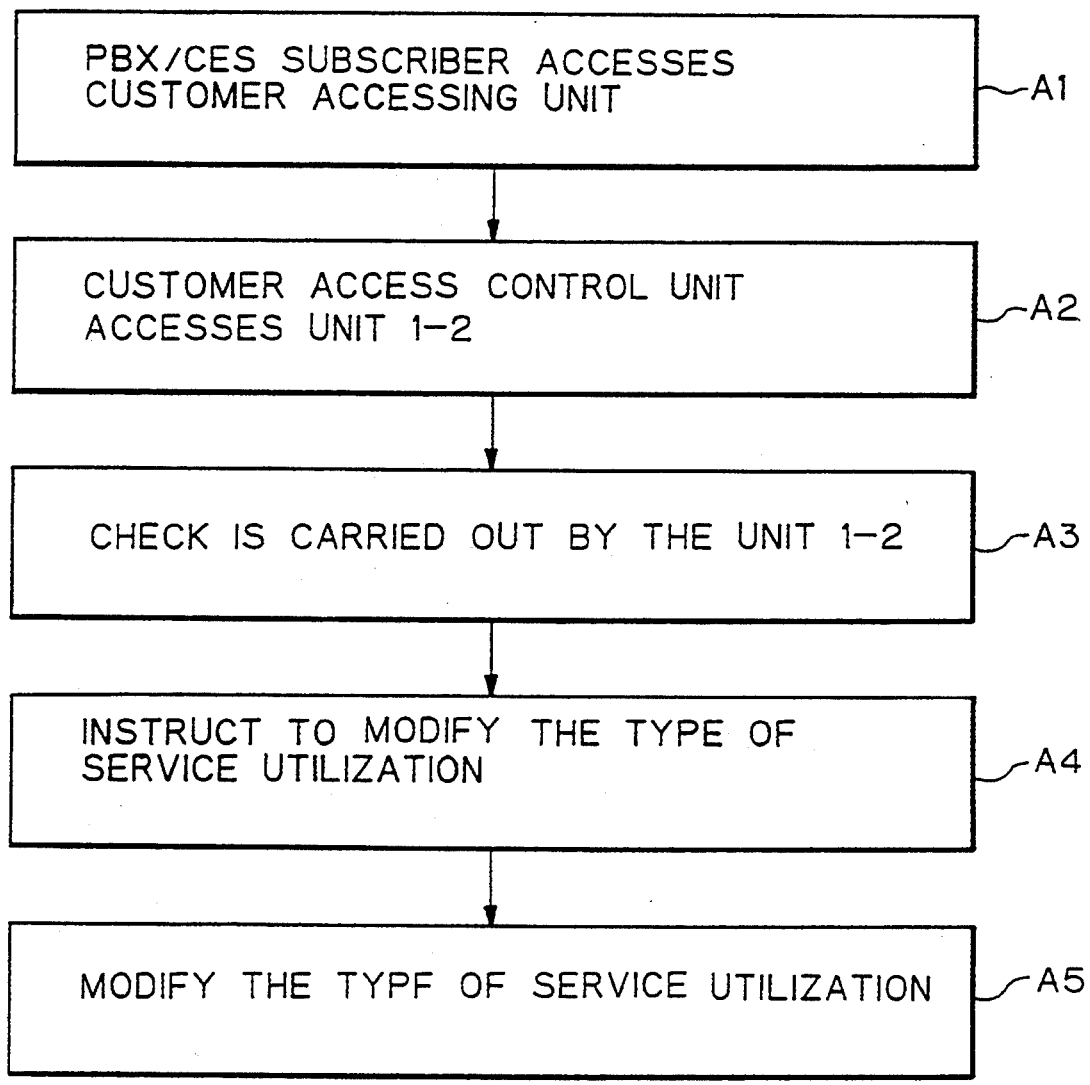
FIG. 5 is a flowchart explaining the operation of the system shown in FIG. 4.

FIG. 4 is an explanatory and schematic block diagram of the global subscriber group service system explaining the operation of a service when a PBX/CES subscriber requires a service, according to the first embodiment of the present invention, and FIG. 5 is a flow-chart explaining the operation of the system shown in FIG. 4.

Referring to FIG. 4, it is assumed that the PBX subscriber 3a or the CES subscriber 4a requires the modification of a global subscriber group service type so as to include an individual subscriber 5 into the global subscriber group. Then, in accordance with the request from the PBX subscriber 4a or the CES subscriber 4a, the PBX subscriber 3a or the CES subscriber 4a accesses the customer access control unit 2-2-1 provided in the local switching node 2 (see (1) of FIG. 4 and step A1 of FIG. 5) to inform the same of the request for a modification of the service type.

Then, the customer access control unit 2-2-1 accesses the service utilization modification control unit 1-2 provided in the utilization control unit 1 through the common channel signalling network 11 or a communication path requesting the modification of the utilization type of a global subscriber group service (see (2) in FIG. 4 and step A2 in FIG. 5).

Then, the service utilization modification control unit 1-2 carries out, through communication with the customer, a security check by means of the telephone number of the caller, a password, etc., a check of whether or not the request for a modification of the utilization type is suitable for a predetermined format, a guidance to acknowledge the contents of the request and the sequence to modify the utilization type, an acknowledgement of an image after the modification, a judgement of whether a test is necessary (see (3) in FIG. 4 and step A3 in FIG. 5). Then, the service utilization type modification control unit 1-2 modifies the services to include the individual subscriber into the global subscriber group 10 by storing, into a data base (not shown in the figure) in the service utilization type modification control unit 1-2, a logical number corresponding to a physical number of the individual subscriber 5.

In accordance with the modification in the service utilization type modification control unit 1-2, the service utilization type modification control unit 1-2 instructs the service utilization control unit 1-1 in the service control node 1, the service utilization access control unit 2-1-2 for an individual subscriber, and the service utilization access control unit 2-1-1 for the PBX/CES subscriber, to modify the type of utilization of the services so as to satisfy the request from the PBX/CES subscriber 3a or 4a (see (4) in FIG. 4 and step A4 in FIG. 5) so that the individual subscriber 5 can use any of the registered types of services including a connection, a transfer, a utilization of a private line and so forth through the total network.

Thus, the service utilization type for the global subscriber group can be modified (see step A5 in FIG. 5).

In the example shown in FIG. 4, the units 2-1-1, 2-2-1, 1-1, and 1-2 depicted by boxes with slashed lines are accessed. Although the data base is not depicted in FIG. 4, each of the service utilization control unit 1-1 and the service utilization type modification control unit 1-2 has a data base for storing the relationship between the physical number and the logical number of each subscriber and the services related thereto.

Figure 6:
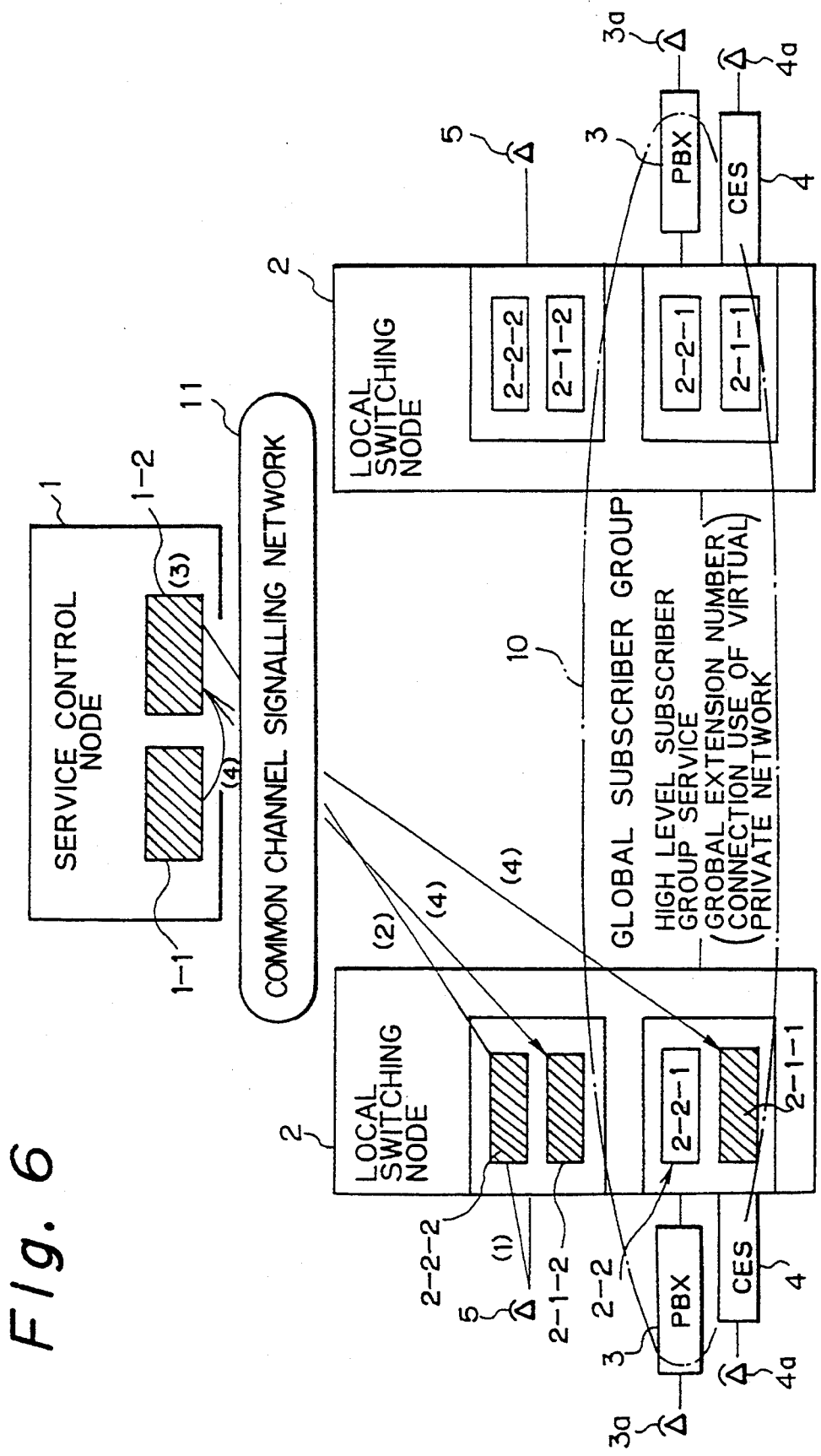
FIG. 6 is an explanatory and schematic block diagram of the global subscriber group service system for explaining the operation of a service when an individual subscriber requires a service, according to the first embodiment of the present invention.
Figure 7:
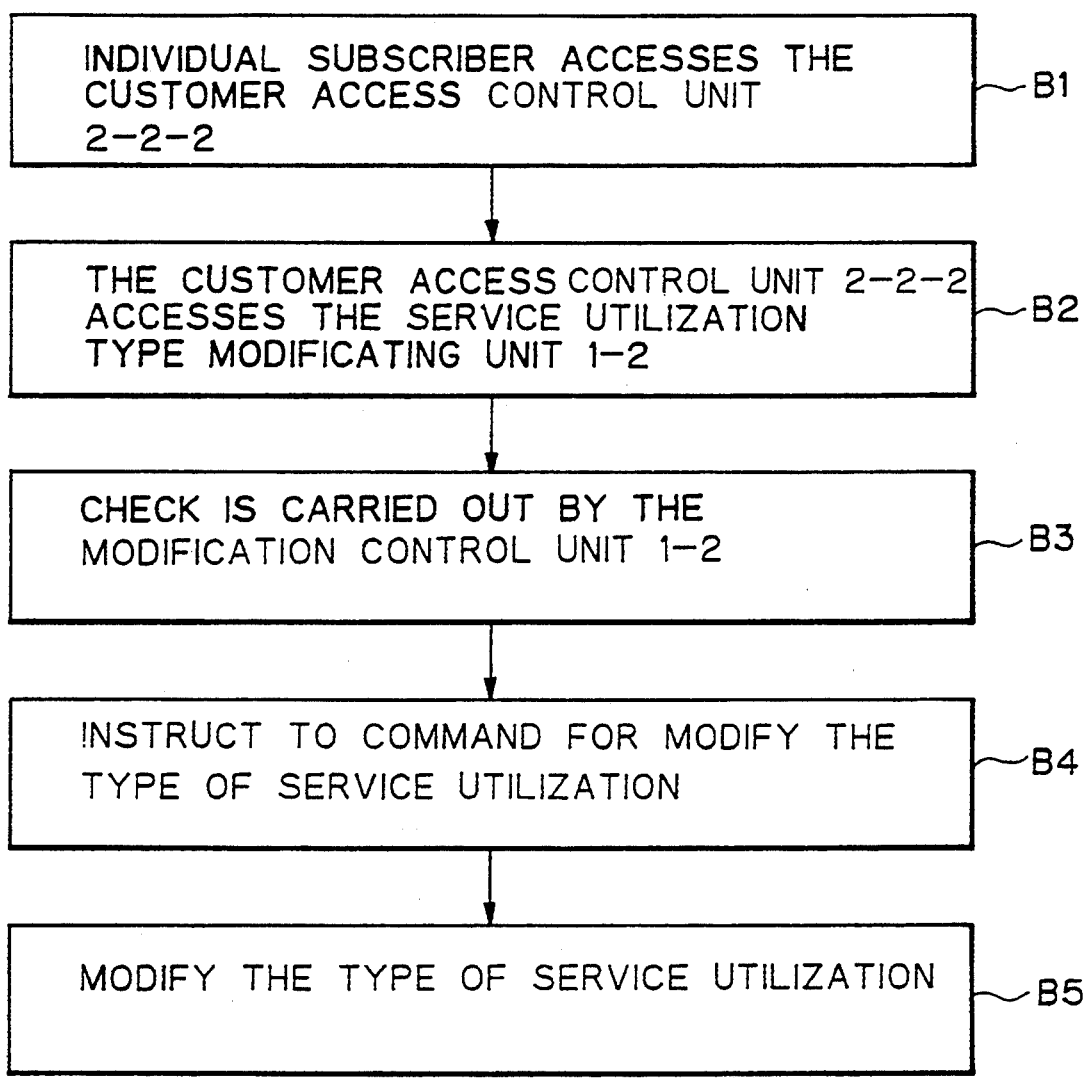
FIG. 7 is a flowchart explaining the operation of the system shown in FIG. 6.

FIG. 6 is a block diagram explaining another example of the operation of a service type modification requested by the individual subscriber 3a, and FIG. 7 is a flowchart explaining the operation of the same, according to the first embodiment of the present invention.

Referring to FIG. 6, it is assumed that the individual subscriber 5 is previously registered as a member of one or a plurality of global subscriber groups. When the individual subscriber 5 requires the modification of a global subscriber group service type, then, in accordance with the request from the individual subscriber 5, the individual subscriber 5 accesses the customer accessing unit 2-2-2 provided in the local switching node 2 (see (1) of FIG. 6 and step B1 of FIG. 7) to inform the same of the request for a modification of the service type.

Then, the customer accessing unit 2-2-2 accesses the service utilization modification control unit 1-2 provided in the utilization control unit 1 through the common signal line network 11 or a communication path to request the modification of the utilization type of a global subscriber group service (see (2) in FIG. 6 and step B2 in FIG. 7).

Then, the service utilization modification unit 1-2 carries out, through communication with the customer, a security check by means of a telephone number of the caller, a pass word, etc., a check of whether or not the request for a modification of the utilization type is suitable for the predetermined format, a guidance to acknowledge the contents of the request and the sequence to modify the utilization type, an acknowledgement of an image after the modification, a judgement of whether a test is necessary (see (3) in FIG. 6 and step B3 in FIG. 7). Then, the service utilization type modification unit 1-2 modifies the services.

In accordance with the modification in the service utilization type modification unit 1-2, the service utilization type modification control unit 1-2 instructs the service utilization control unit 1-1 in the utilization control unit 1, the service utilization access control unit 2-1-2 for an individual subscriber, and the service utilization access control unit 2-1-1 for the PBX/CES subscriber, to modify the type of utilization of the services so as to satisfy the request from the individual scriber 5 (see (4) in FIG. 6 and step B4 in FIG. 7) so that the individual subscriber 5 can use any of the registered types of services including a connection, a transfer, the utilization of a private line and so forth through the total network.

Thus, the service utilization type for the global subscriber group can be modified (see step B5 in FIG. 7).

Figure 8:
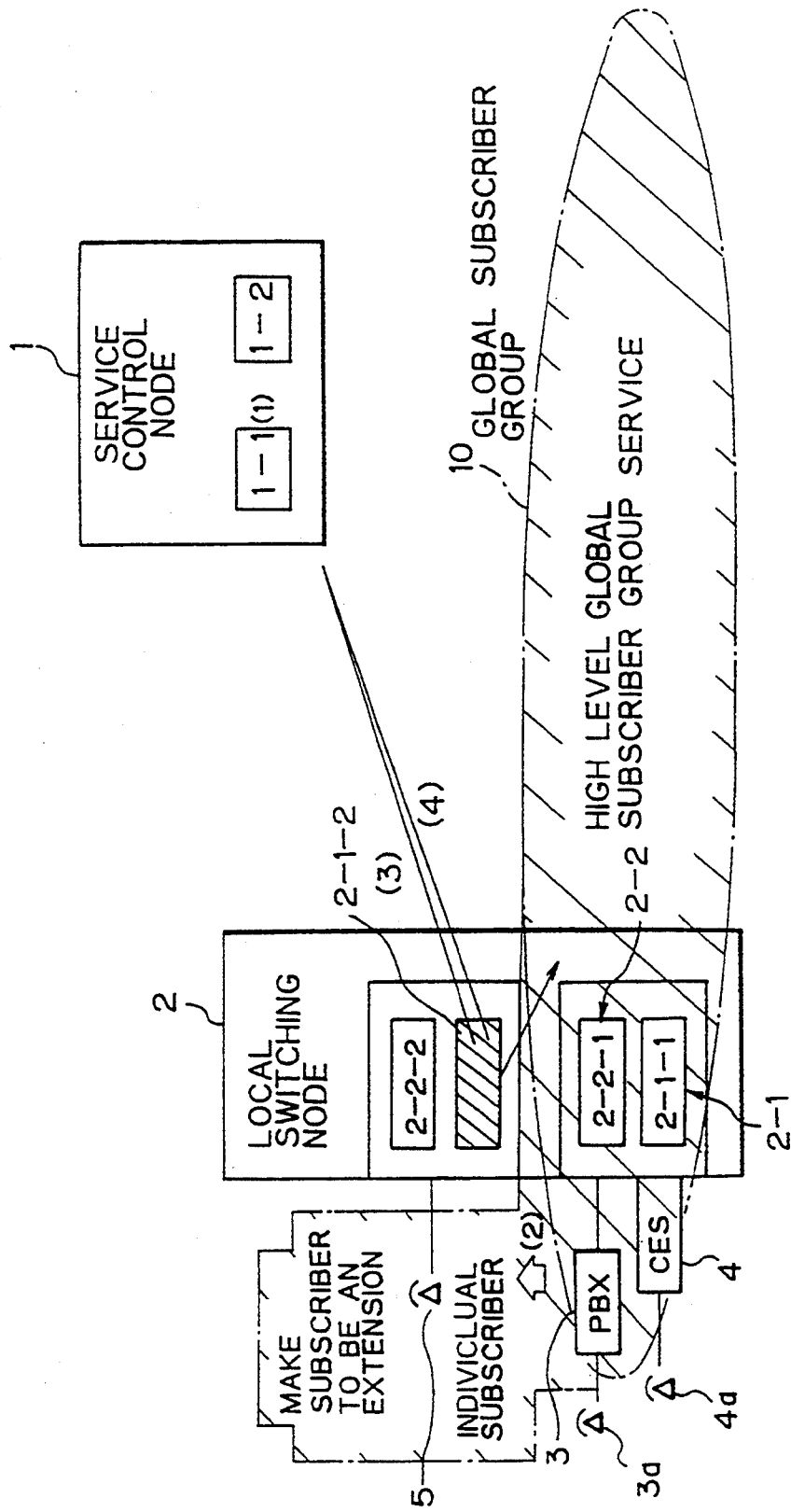
FIG. 8 is an explanatory and schematic block diagram for explaining the operation for services required by an individual subscriber registered as an extension terminal in the global subscriber group service system according to the first embodiment of the present invention.
Figure 9:
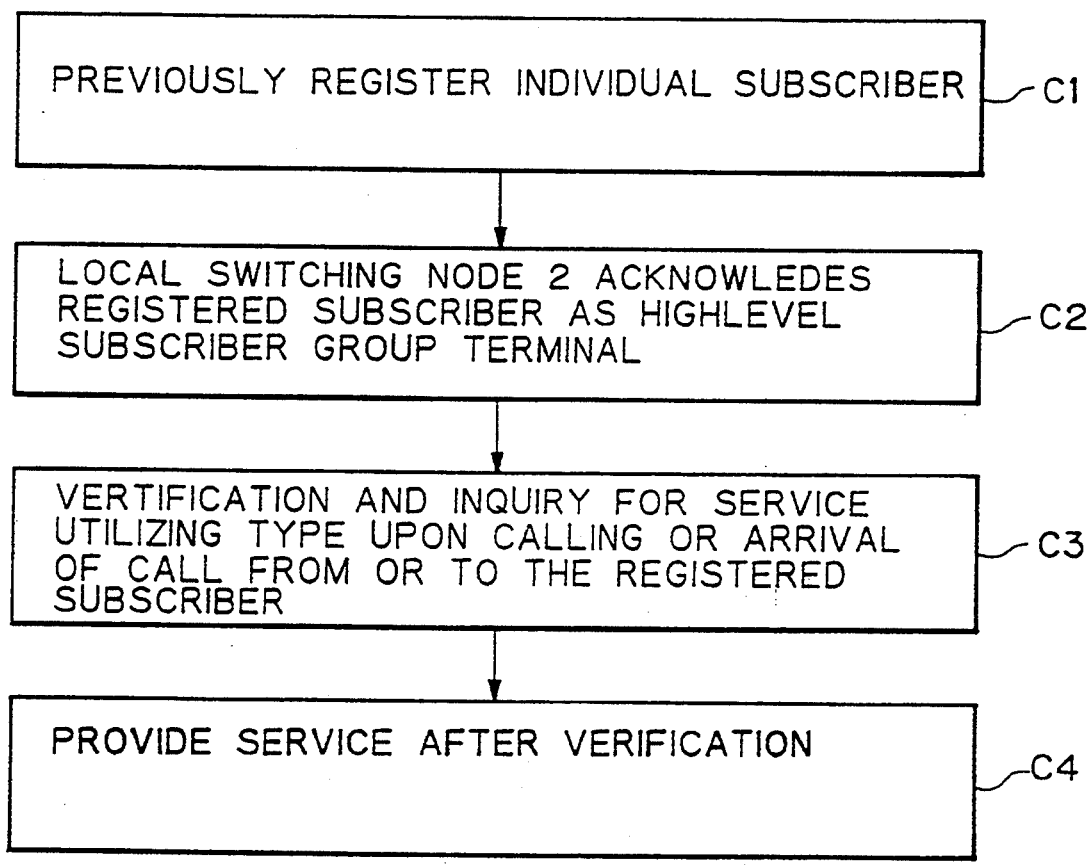
FIG. 9 is a flowchart explaining the operation of the system shown in FIG. 8.
Figures 3, 10B:
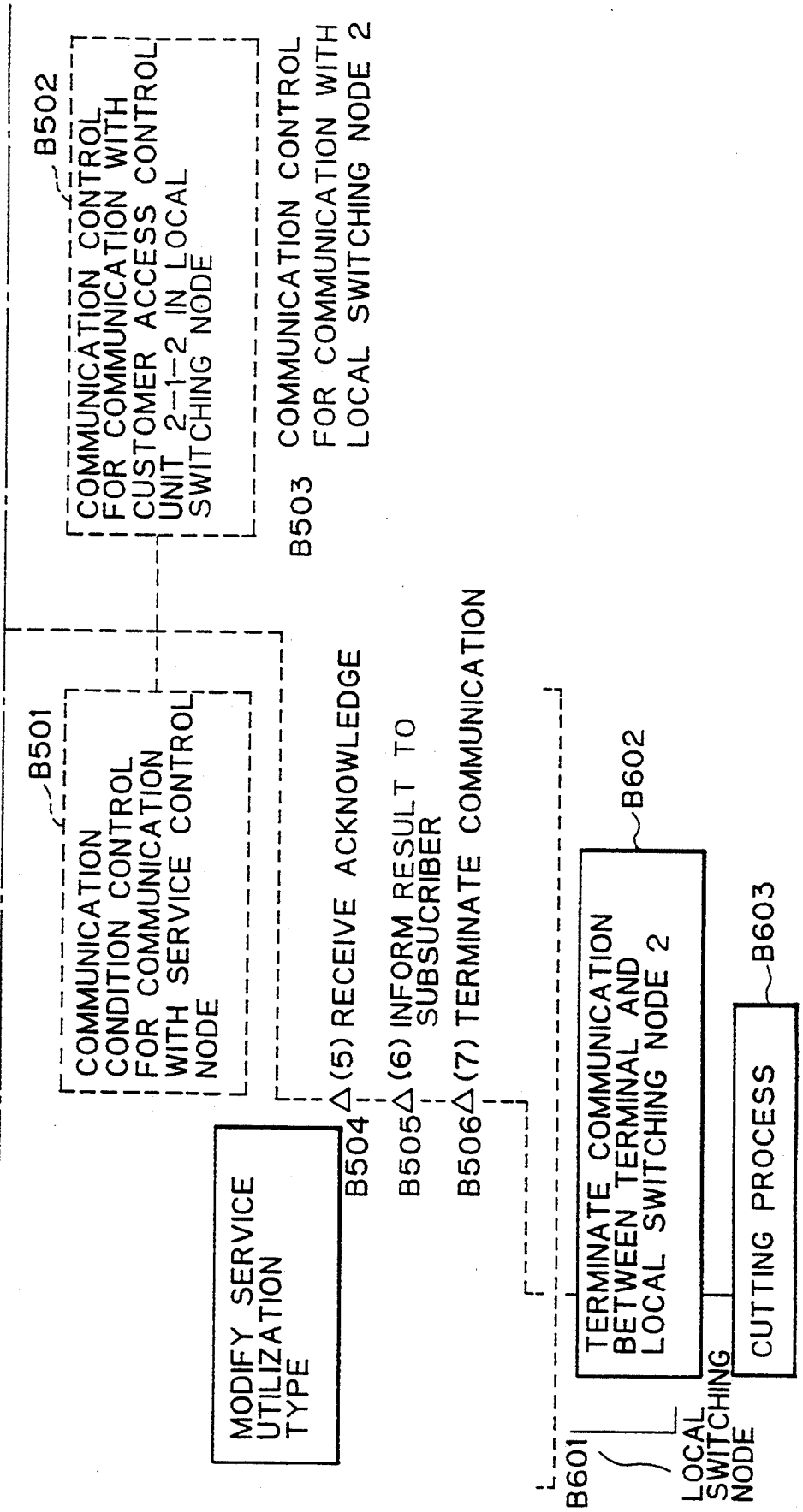

FIG. 8 is an explanatory and schematic block diagram for explaining the operation of services required by an individual subscriber registered as an extension terminal in the global subscriber group service system according to the first embodiment of the present invention, and FIG. 9 is a flowchart explaining the operation of the system shown in FIG. 8.

Previously, an individual subscriber 5 is registered in the utilization control unit 1-1 so that it may operate as one of the global extension terminals in one or more subscriber groups (see (1) of FIG. 8 and step C1 of FIG. 9)

With respect to the terminal 5 of the individual subscriber registered in the utilization control unit 1-1, upon making a call from the terminal 5 or the arrival of a call at the terminal 5, the terminal 5 is identified as a high level global subscriber group terminal. (see (2) of FIG. 8 and step C2 of FIG. 9).

When a call is generated from the registered individual subscriber terminal 5 or a call is received by the subscriber terminal 5, the individual subscriber utilization access control unit 2-1-2 in the local switching node 2 verifies and inquires into the registered service type, including network wide connection service, transfer service use conditions, virtual private network service use conditions, accounting conditions and so forth, to the utilization control unit 1-1 in the service control node 1 (see (3) of FIG. 8 and step C3 of FIG. 9).

Subsequently, by receiving an acknowledgement from the service control node 1, the terminal 5 receives the demanded high level global subscriber group service. (see (4) of FIG. 8 and step C4 of FIG. 9).

As described above, according to the first embodiment of the present invention, it becomes possible to provide a global subscriber group service system in which, by providing special control units in both the service control node 1 and the local switching unit 2, not only the PBX/CES subscribers, but also individual subscribers can use the services of the global subscriber group. Further, by adding the customer control function, it is possible for the types of utilization of the services to be flexibly modified.

A further detailed discussion will be provided for the process of modifying the service type assigned for the subscriber, with reference to FIGS. 10A-1, 10A-2, and 10B-1 to 10-B3.

As can be seen from FIG. 10A-1 and FIG. 10A-2, the process for modifying the registered type of utilization of services required by an individual subscriber is initiated when the individual subscriber generates a call (B100) and dials a specific number for modifying the type of service (B101). The call is received by the customer access control unit 2-2-2 in the local switching node 2, to which the specific subscriber is accommodated. Then, the customer access control unit 2-2-2 in the local switching node 2 analyzes the dialed number entered through the call (B102). If it is determined that the request is to modify the type of service (B103), the process moves to a data communication state between the subscriber terminal and the local switching node (B104). Here, it should be appreciated that when the specific subscriber makes a call for communication to a certain terminal other than the call for requesting to modify the service type, the local switching node 2 performs a well known switching operation to establish communication with the destination terminal.

By switching into the data communication mode with the terminal of the specific subscriber, the communicating condition control module 204, the security control module 205, and the service type registering module 206 in the customer access control unit 2-2-2 in the local switching node 2 are actuated.

In the shown example, it is assumed that the specific subscriber is the individual subscriber. Therefore, the general subscriber corresponding interface 201 becomes active to start control of communication through either in-channel using information or push button signals or out-channel using control signals with the subscriber's terminal in cooperation with the communicating condition control module 204 (B201). Then, the customer access control unit 2-2-2 in the local switching node 2 accesses the service utilization type modification control unit 1-2 in the service control node 1.

Then, at first, a reception check (B202) is performed according to the reception procedure provided by the service type registering module 206. During the reception check process, the specific subscriber is required to enter the subscriber number and various security information, such as subscriber ID when the subscriber has moved from, for example, a PBX terminal to an individual terminal. In the reception check process B202, such information as above is collected and verified when the information passes through a format check. During this process, the security information collect/acknowledge control module 205 collects necessary security check information and acknowledges thereof.

Once the necessary information from the specific subscriber is collected and verified, the contents of the information for modifying the service is analyzed (B203). The analysis is performed to determine to which group the individual subscriber is required to enter the global service group, whether the request to be registered is a temporary registration or a continuous registration, the number of the service group to which the individual terminal is requesting to enter, and so forth. In the shown example, it is assumed that the individual terminal 5 has not been preliminarily registered as an extension in the global subscriber group and therefore, the required process is to register the individual terminal as an extension of the global subscriber group.

Then, the information necessary for modification and, in this example, for registration of the individual subscriber, is received in accordance with the sequence for reception, registration, and data collection for the service modification (B204).

When the specific subscriber has preliminarily registered for a certain service type and is demanding modification of the service type, the information required is the information necessary for modification of the registered term of the service type. During this process, the service type registering module 206 in the local switching node 2 actively collects the information entered by the specific subscriber.

Once all of the information is collected in the process of B204, then, the collected information is transferred to the security control module 125 in the utilization type modification unit 1-2 of the service control node 1 (B205). By this, a checking process by the utilization type 1-2 of the service control node 1 is initiated.

Once the checking process is initiated, communication is established between the service control node 1 and the local switching node 2 under the control of the communicating condition control modules 124 and 204 (B301 and B302). Then, the security control module 125 actively performs security check (B303). As set forth above, the security check is performed through the caller's number, password and so forth and performs a propriety check of the modification of the use type, confirms the content, provides guidance for modification manner, confirms the post-modification image, and the necessity of a test and so forth, with the customer.

After completion of the security check, the security control module 125 analyzes of the content of the required modification of the registered term for the service type (B304). Since the shown case requires a new registration of the new subscriber, the new registration is recognized. Then, the service type registering module 121 is triggered to effect a registration with a specific logical number given for the new subscriber (B305). Also, in the process of B305, an instruction for the modification of the service type is given to the utilization access control unit 2-1 in the service control node 1. In addition, in the process of B305, the contents in the data base connected to the utilization access control unit 2-1 is updated.

Then, the utilization control unit 1-1 that manages logical numbers is accessed by the utilization access control unit 2-1 for the registration (B306) of a new extension number for use, and for informing the service utilization access control unit 2-1-2 in the local switching node 2 that the calling subscriber has become a new extension terminal.

To this end, communication is carried out between the service utilization access control unit 2-1-2 in the local switching node 2 and the service control node 1 (B401, 402).

After completion of the foregoing process, communication is started (B403), and the special service, i.e., in this example, making the individual subscriber an extension of the global subscriber group, is registered in the service utilization access control unit 2-1-2 (B404). Then the communication is completed and the verification of the result is performed at the service control node 1 (B405).

Thereafter, the service control node 1 effects a verification of the registered content and returns the verified information to the local switching node 2 (B406).

Then, to actually modify the type of service utilization, again the communicating condition control modules 124 and 204 are activated for transferring verifying information indicative of the condition before and after modification from the service control node 1 to the local switching node 2 (B501 through B503). The local switching node 2 receives the verifying information transmitted from the service control node 1 (B504), and reports the result to the terminal of the specific subscriber (B505). Then, the communicating condition control modules 124 and 204 terminates communication between the service control node 1 and the local switching node 2 (B506).

Once the result is reported from the local switching node 2, the subscriber terminal terminates communication (B601 to B603). Thereafter, connection between the subscriber and the local switching node 2 is cut (B603).

As can be understood from the above discussion, the individual subscriber can be registered as an extension in the global subscriber group for receiving services registered. Once, the registration is established, the individual subscriber terminal may operate as a terminal in the global subscriber group to enjoy the predetermined services provided for the global subscriber group. Of course, the individual subscriber may operate as a normal telephone terminal irrespective of the global subscriber group service system.

Figure 11:
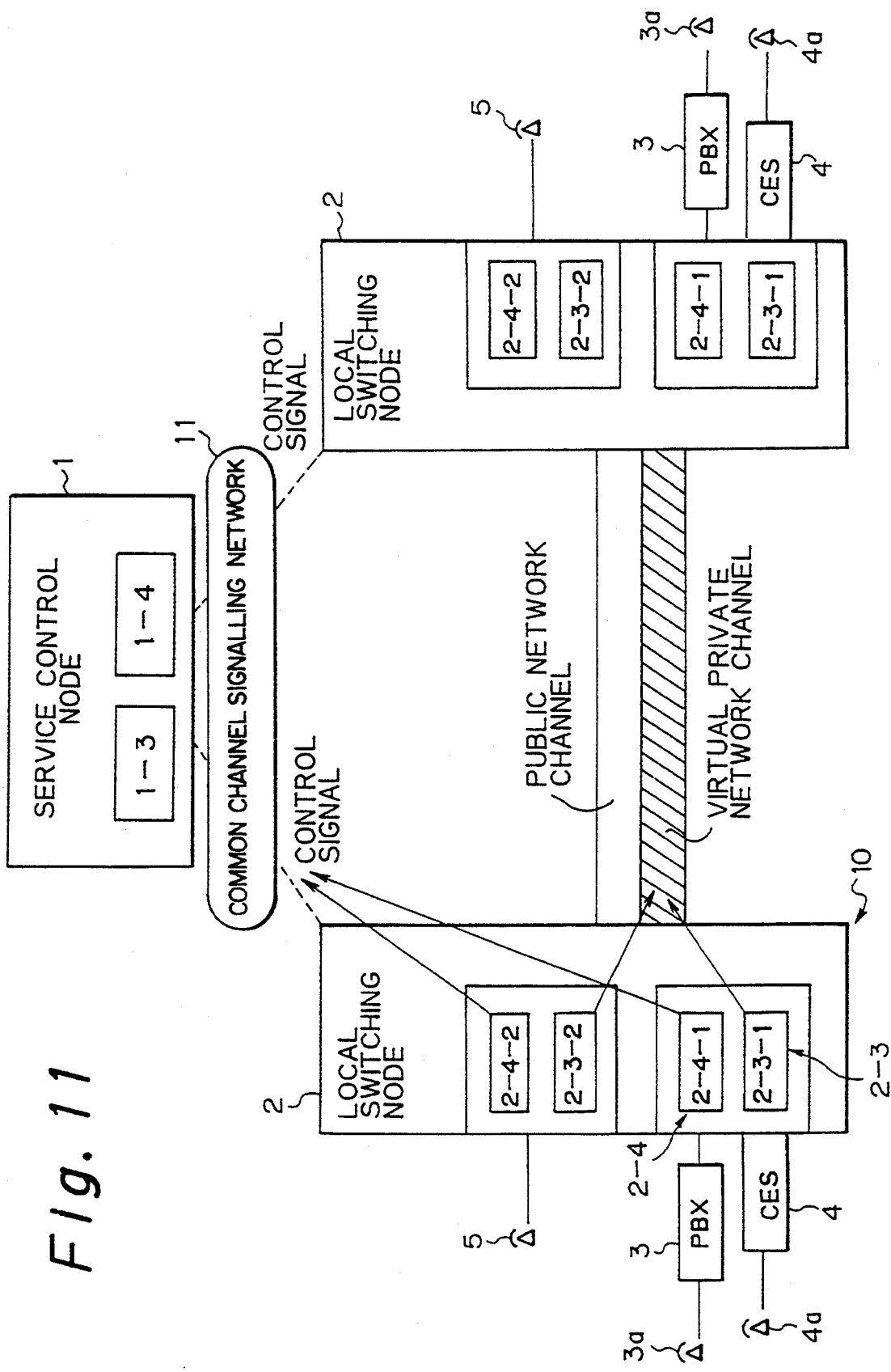
FIG. 11 is a block diagram showing the global subscriber group service system in which the service to use a virtual private network is performed according to a second embodiment of the present invention.

FIG. 11 is a block diagram showing a global subscriber group service system according to a second embodiment of the present invention. The shown embodiment of the global subscriber group service system performs a service using a virtual private network. As can be appreciated, the construction of the system is similar to that of the first embodiment described above. In FIG. 11, the service control node 1 includes a utilization control unit 1-3 and a modification control unit 1-4. The utilization control unit 1-3 controls a virtual private network for the global subscriber group 10, and the modification control unit 1-4 modifies a service type of the virtual private network for the global subscriber group 10. On the other hand, in the local switching node 2, there is provided a service utilization access control unit 2-3 and customer access control unit 2-4. The service utilization access control unit 2-3 enables use of service for the virtual private network through the utilization control unit 1-3 in the service control node 1, and customer access control unit 2-4 registers or modifies a service type for the virtual private network for the global subscriber group 10 by accessing the modification control unit 1-4 of the service control node 1 from a subscriber included in the local switching node 2. The utilization access control unit 2-3 comprises the PBX/CES utilization access control unit 2-3-1 for PBX/CES subscribers 3a and 4a and the individual subscriber service access control unit 2-3-2 for individual subscribers. On the other hand, the customer access control unit 2-4 comprises the PBX/CES customer access control unit 2-4-1 for the PBX/CES subscribers 3a and 4a and the individual subscriber customer access control unit 2-4-2 for independent subscribers 5.

With the construction set forth above, in the shown embodiment of the global subscriber group service system, services for the virtual private network for the global subscriber group 10 are possible by accessing the utilization access control unit 2-3 of the local switching node 2 from the utilization control unit 1-3 of the service control node 1, and registration and/or modification of the type of service for the virtual private network for the global subscriber group 10 is possible by accessing the modification control unit 1-4 in the utilization control unit 10 through the customer access control unit 2-4 from the subscriber included in the local switching node 2.

Figure 12:
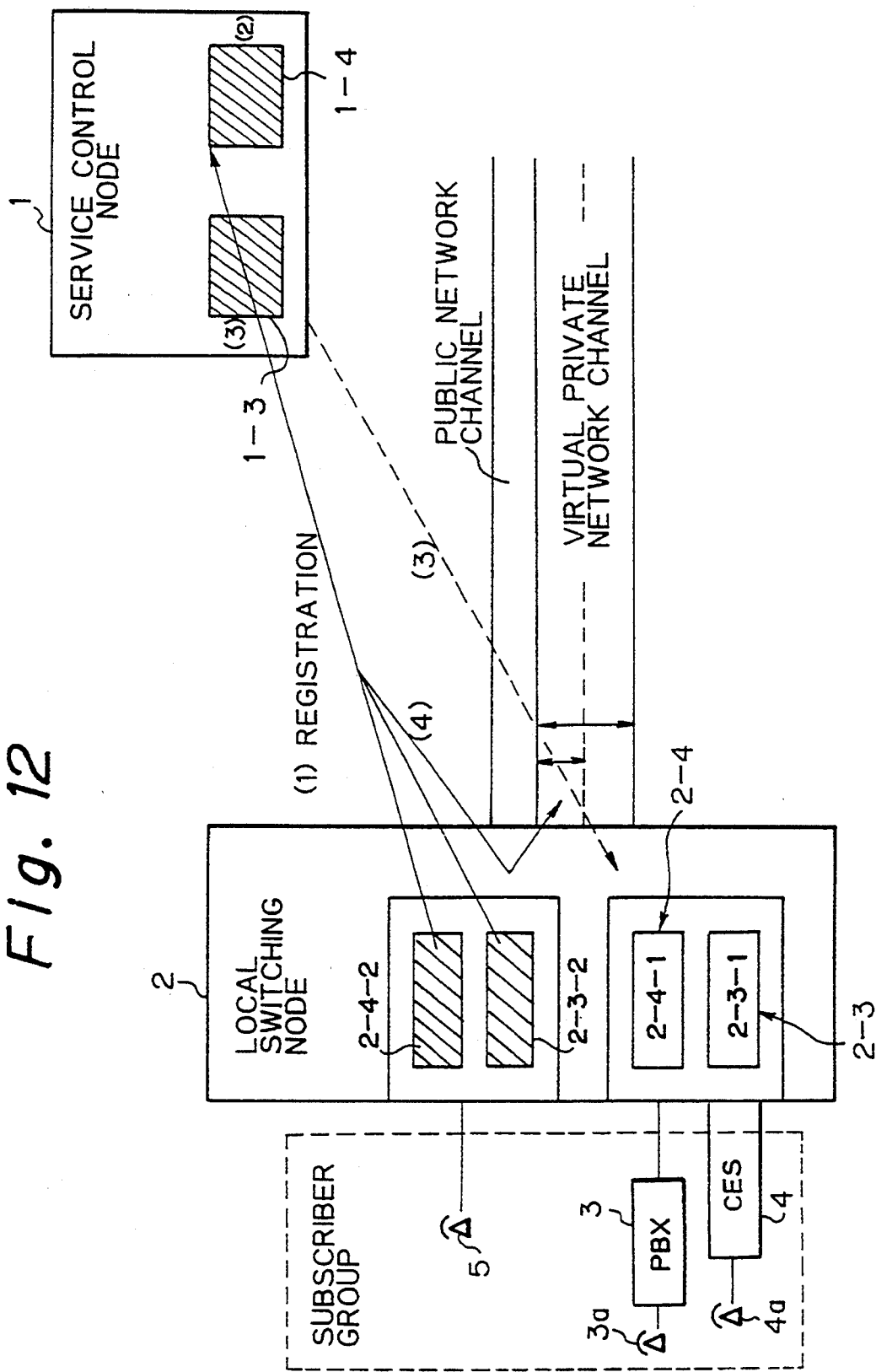
FIG. 12 is a block diagram showing the global subscriber group service system in which the service of a virtual private network is performed for an individual subscriber according to the second embodiment of the present invention.
Figure 13:
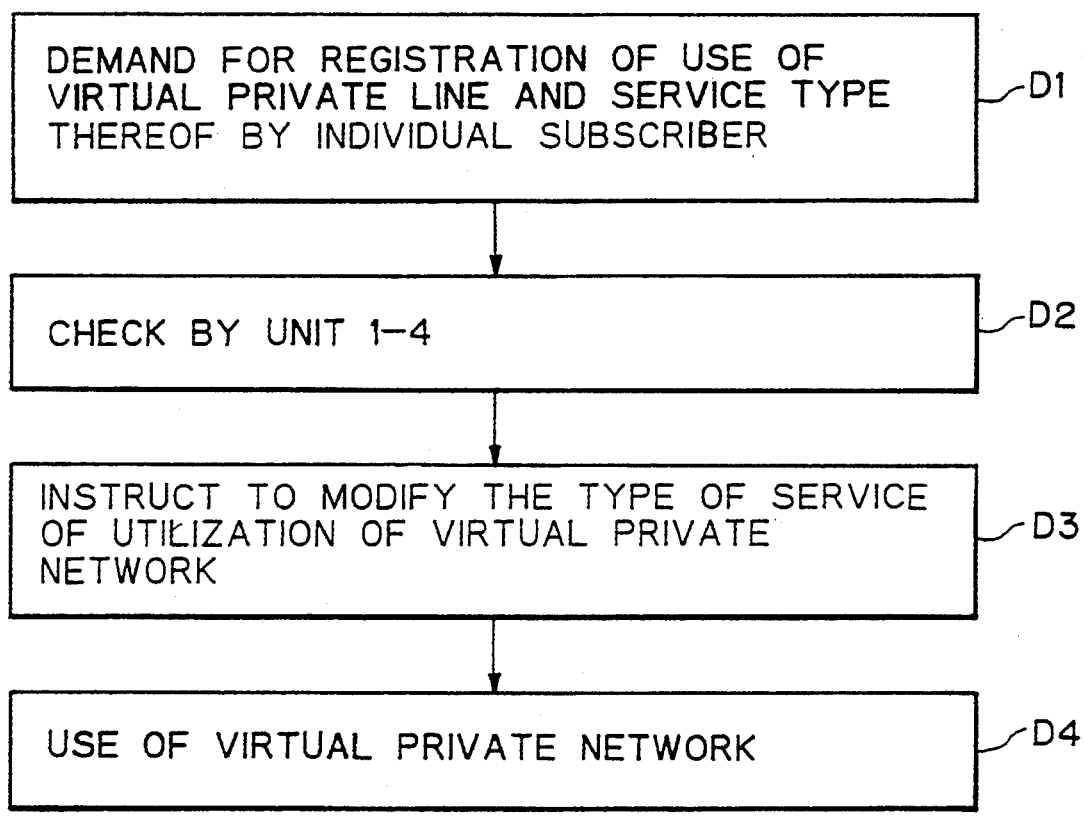
FIG. 13 is a flowchart explaining the operation of the system shown in FIG. 12.

Next, discussion will be provided for an example of the realization of use of the service of the virtual private network by the independent subscriber 5, with reference to FIGS. 12 and 13.

At first, the individual subscriber 5 requests the registration (including modification and cancellation) of use of the virtual private network and its service type at the local switching node 2. In response to the request, the modification control unit 2-4-2 in the local switching node 2 accesses the modification control unit 1-4 in the service control node 1 for customer control (see (1) in FIG. 12 and step D1 of FIG. 13).

Then, the modification control unit 1-4 in the service control node 1 performs a security check by using the caller number, password and so forth, performs a propriety check of the modification of the use type, confirms the content of the request, provides a guidance for a modification sequence, confirms the post-modification image, and the necessity of a test and so forth, by a communication with the customer. Furthermore, if necessary, the modification control unit 1-4 performs a mutual check determining whether the calling subscriber should be permitted to use the virtual private network and checks the modified content of the accounting condition accompanying the permission (see (2) in FIG. 12 and step D2 of FIG. 13).

After performing the above-mentioned checks, the service control node 1 instructs the utilization control unit 1-3 and virtual private network management sections in the respective local switching nodes 2 to modify the virtual private network service type, in order to satisfy the request from the customer (individual subscriber) for use type (including demands for the establishment of a virtual network at a specific time range, modification of channel capacity, use free accounting condition and so forth) (see (3) in FIG. 12 and step D3 of FIG. 13).

Thus, when the individual subscriber 5 demands to use the virtual private network by dialing a specific number or to use a demanding key, use of, modification, or termination of the use of the virtual private network can be initiated (see (4) in FIG. 12 and step D4 in FIG. 13).

It should be noted that, in this case, it may be possible to use the virtual private network by performing the operation associated with the foregoing steps D1 through D4 when using the service instead of making a preliminary registration.

By this, the independent subscriber 5 can use the virtual private network as one terminal of the high level global subscriber group on a temporary basis, by using the customer access function to the service control node 1.

Also, it is possible to modify the channel capacity and routing method of the virtual private network with respect to each time range.

Figure 14:
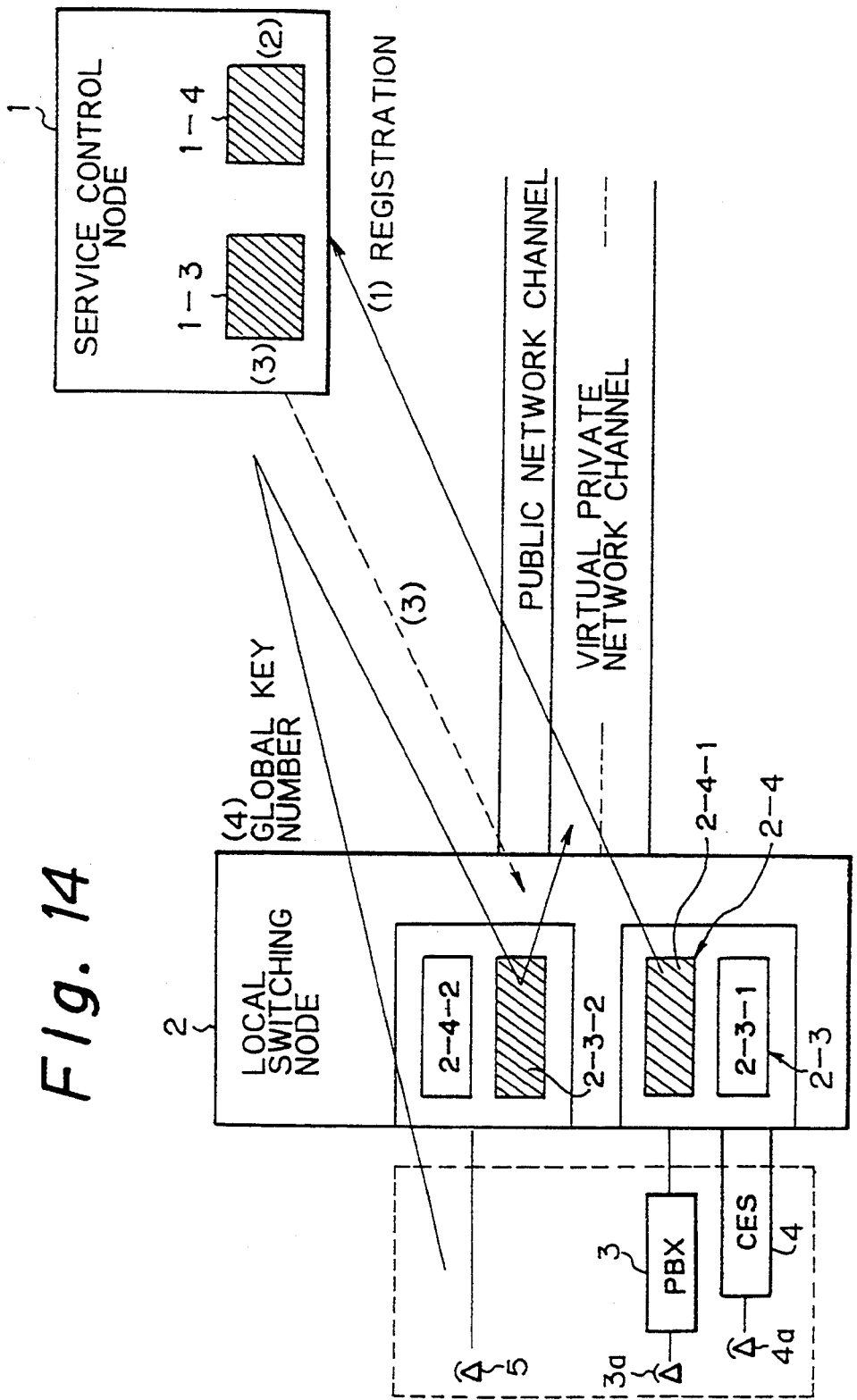
FIG. 14 is a block diagram of the global subscriber group service system explaining the deliver service to the global destination by using the virtual private network, according to the second embodiment of the present invention.
Figure 15:
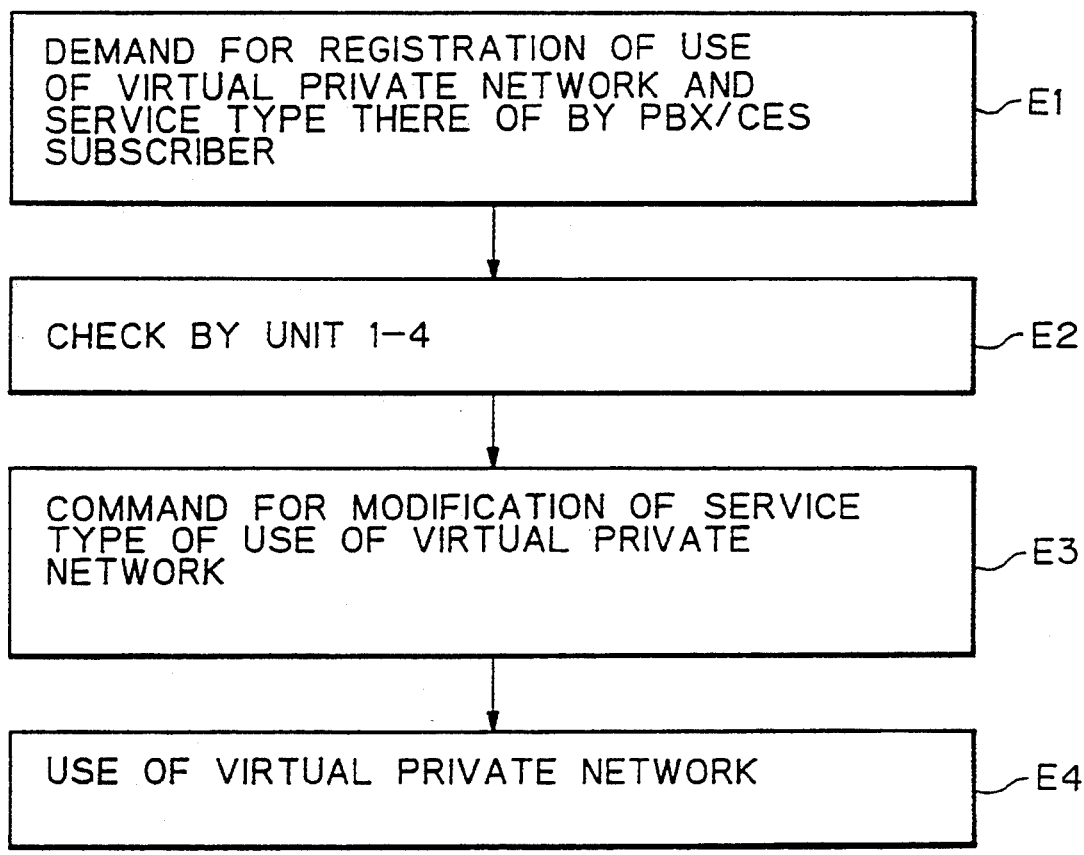
FIG. 15 is a flowchart explaining the operation of the system shown in FIG. 14.

Next, a discussion will be provided for a flexible global arriving call distribution service using the virtual private network according to the second embodiment of the present invention, with reference to FIGS. 14 and 15.

At first, the PBX/CES subscriber 3a or 4a demands registration (including modification and cancellation) of use of the virtual private network and its service type of the individual terminal therein for the service control node 1 by accessing the modification control unit 1-4 of the service control node 1 for customer control through the customer access control unit 2-4-2 in the local switching node 2 for accessing from the PBX/CES subscriber 3a or 4a to the service control node 1 (see (1) in FIG. 14 and step E1 of FIG. 15).

Figure 17:
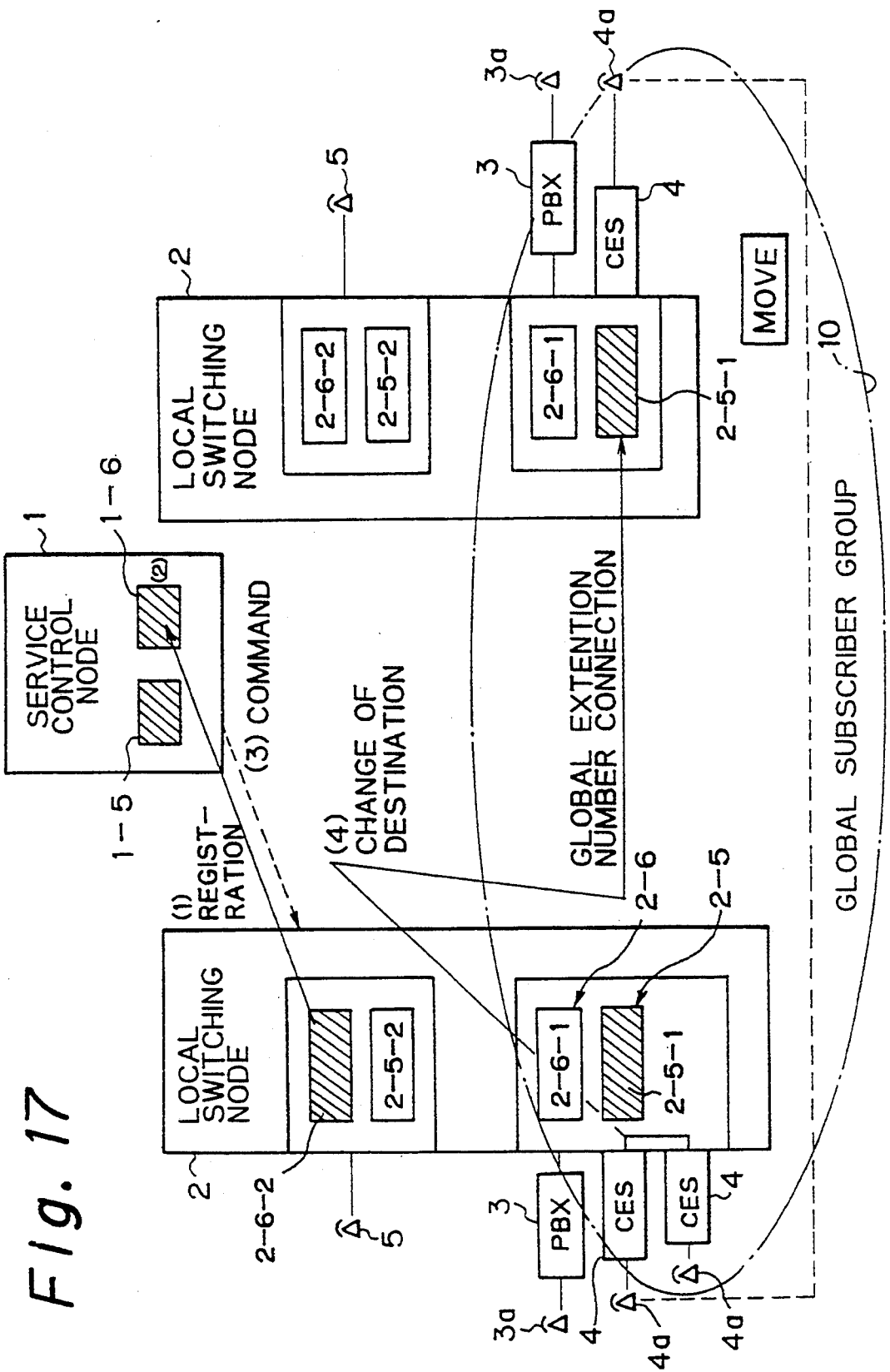
FIG. 17 is a block diagram showing a global subscriber group service system explaining the service to modify the management type of the global extension number for an individual subscriber according to the third embodiment of the present invention.
Figure 18:
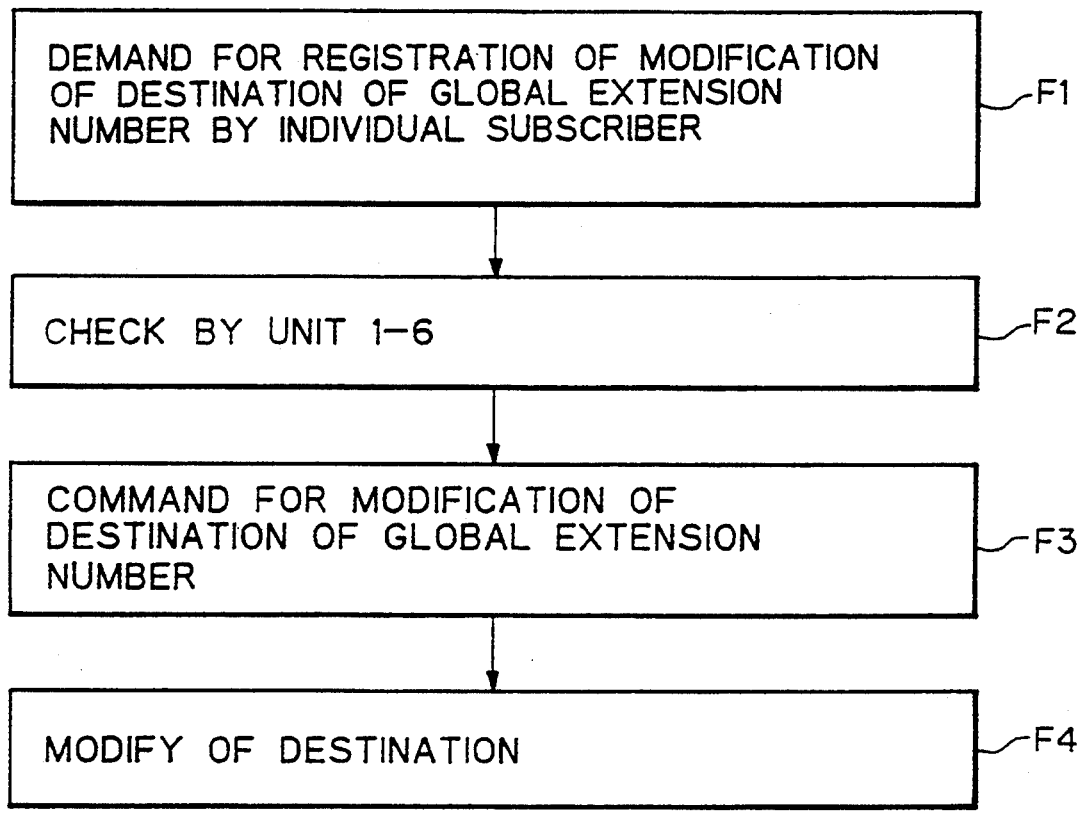
FIG. 18 is a flowchart explaining the operation of the system shown in FIG. 17.

Then, the modification control unit 1-4 in the service control node 1 performs a security check by using the caller number, password and so forth, performs a propriety check of the modification of the use type, confirms the content of the request, provides a guidance for a modification sequence, confirms the post-modification image, and the necessity of a test and so forth, by a communication with the customer (see (2) of FIG. 17 and step E2 of FIG. 18).

Also, the service control node 1 commands the modification of a virtual private network service type at the utilization control unit 1-3 thereof, and virtual private network management sections of respective local switching nodes 2, in order to satisfy the demand of the customer, i.e., the PBX/CES subscriber 3a or 4a in this example, for a service type such as a modification of global destination of the arriving call, modification of distribution ratio/channel capacity ratio and so forth (see (3) in FIG. 14 and step E3 of FIG. 15.

By this, when any one of the subscribers makes a call by dialing the global key number for a certain subscriber group, the virtual private network use control unit 1-3 in the service control node 1 and the virtual private network use access control unit 2-3-2 in the local switching node 2 for the individual subscriber can initiate, change, or terminate the use of the virtual private network in a certain service type such as a modification of the global arrival call key destination, ACD arrival call distribution and so forth (see (4) of FIG. 14 and step E4 of FIG. 15).

Thus, by providing a virtual private network use function for the individual subscriber 5 in response to the arriving call from the individual subscriber 5 to a specific number (global key number), flexible global arriving call distribution using the virtual private network becomes possible.

With the second function, by enabling the individual subscriber 5 other than the PBX/CES subscriber 3a or 4a to use the virtual private network, a wide range of services that has not been available in the prior art, can be provided. Furthermore, by providing the customer control function for the virtual private network, flexible use of the virtual private network can be provided for the subscribers and thus a flexible and highly responsive service can be provided.

Figure 16:
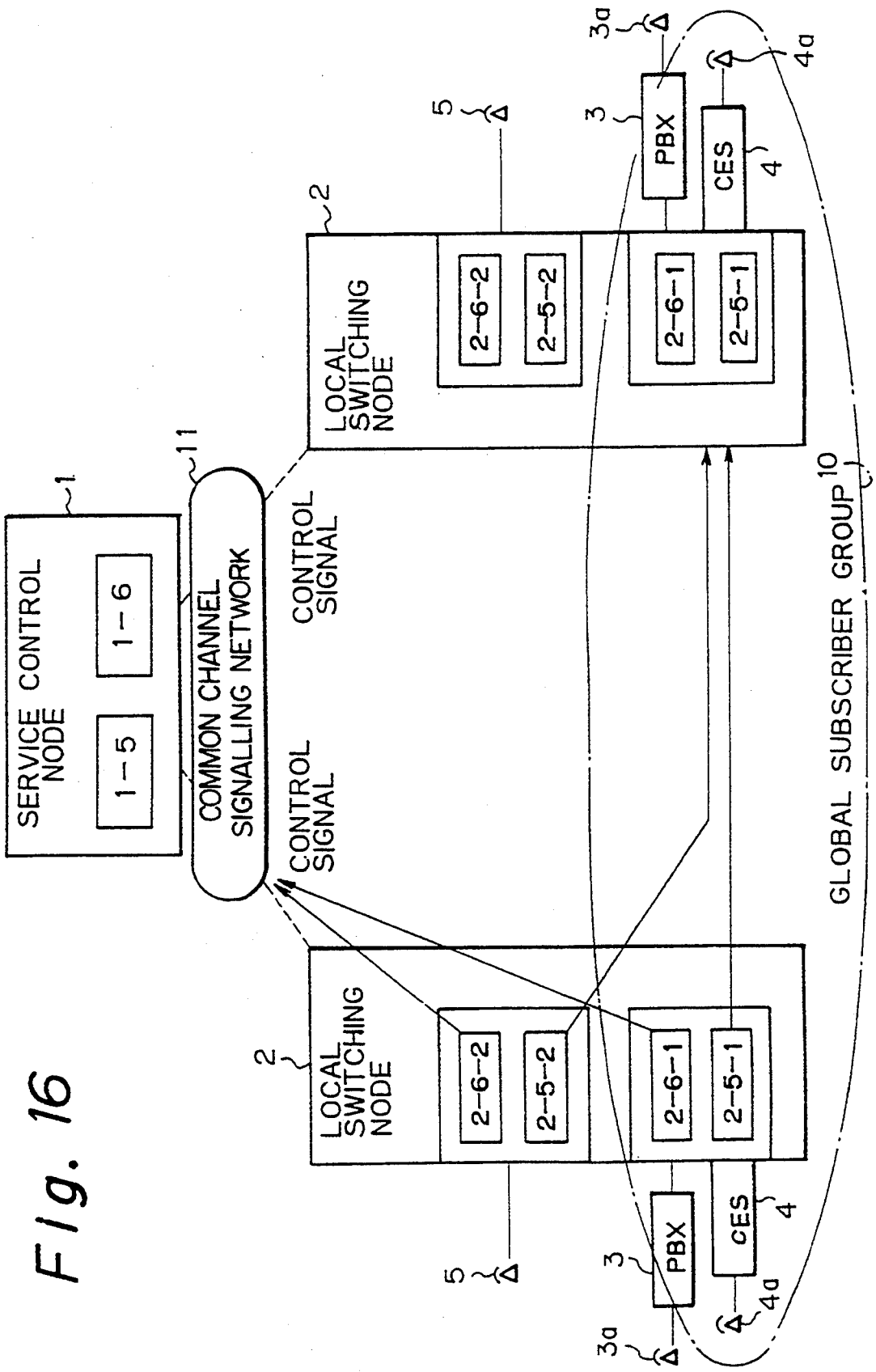
FIG. 16 is a block diagram showing a global subscriber group service system explaining the extension number management service, according to a third embodiment of the present invention.

FIG. 16 is a block diagram showing a global subscriber group service system according to a third embodiment of the present invention, in which the management type of global extension numbers can be modified. In FIG. 16, the global subscriber group service system assigns the individual subscriber 5 as one extension terminal in a global extension system established within the global subscriber group 10. In FIG. 16, the service control node 1 includes a utilization control unit 1-5 and a modification control unit 1-6.

The utilization control unit 1-5 controls extension number management for the global subscriber group 10, and the modification control unit 1-6 modifies a management type of the extension number for the global subscriber group 10.

On the other hand, the local switching node 2 includes utilization access control units 2-5-1 and 2-5-2 and customer access units 2-6-1 and 2-6-2. The utilization access control units 2-5-1 and 2-5-2 enable management of the extension numbers through the service control unit 1-3 in the service control node 1, and the customer access control units 2-6-1 and 2-6-2 modify management types for the extension number for the global subscriber group 10 by accessing the modification control unit 1-6 in the service control node 1 from a subscriber accommodated to the local switching node 2.

It should be noted that, in this third embodiment of the present invention also, the local switching node 2 accommodates the PBX/CEX subscribers 3a and 4a, and independent subscribers 5. Therefore, the utilization access control unit 2-5-1 is a PBX/CES service management access control unit for the PBX/CES subscribers 3a and 4a and the utilization access control unit 2-5-2 is an individual subscriber utilization access control unit for individual subscribers. On the other hand, the customer access control unit 2-6 -1 is a PBX/CES customer access control unit and the unit 2-6-2 is an individual subscriber customer access control unit.

With the construction as set forth above, the management of the extension number for the global subscriber group 10 is possible by accessing the utilization control unit 2-5-1 or 2-5-2 in the local switching node 2 from the extension number management control unit 1-5 of the service control node 1, and modification of the management type for the extension number of the global subscriber group 10 is possible by accessing the modification control unit 1-6 of the utilization control unit 10 through the customer access control unit 2-6-1 or 2-6-2 from the subscriber included in the local switching node 2.

One example of a modification of a destination of an arriving call identifying a specific extension number in the global extension system according to the third embodiment of the present invention, will be discussed with reference to FIGS. 17 and 18.

At first, the subscriber who wishes to modify the destination of the arrival call in the global extension system identifying a specific extension number, demands the registration (including modification and cancellation) of a modification of the destination of the delivery of the arriving call in the global extension system. The demand is served by flexibly modifying the call arriving destination to a location where the subscriber using the specific extension number temporarily moves or where a representative may answer in absence, for the service control node 1, by accessing the modification control unit 1-6 in the service control node 1 for customer control through the individual subscriber customer access control unit 2-6-2 in the local switching node 2 for accessing, from the individual subscriber terminal 5, to the service control node 1 (see (1) of FIG. 17 and step F1 of FIG. 18).

Then, the modification control unit 1-6 of the service control node 1 performs a security check with the caller number, password and so forth and performs a propriety check of the modification of the use type, confirms the content, provides a guidance for modification manner, confirms the post-modification image, and the necessity of a test and so forth, with the customer.

Furthermore, if necessary, it permits the inclusion to a higher subscriber group, and the modification content of the accounting condition associated therewith is performed by mutually checking a specific user to be managed (see (2) in FIG. 17 and step F2 of FIG. 18).

Figure 20:
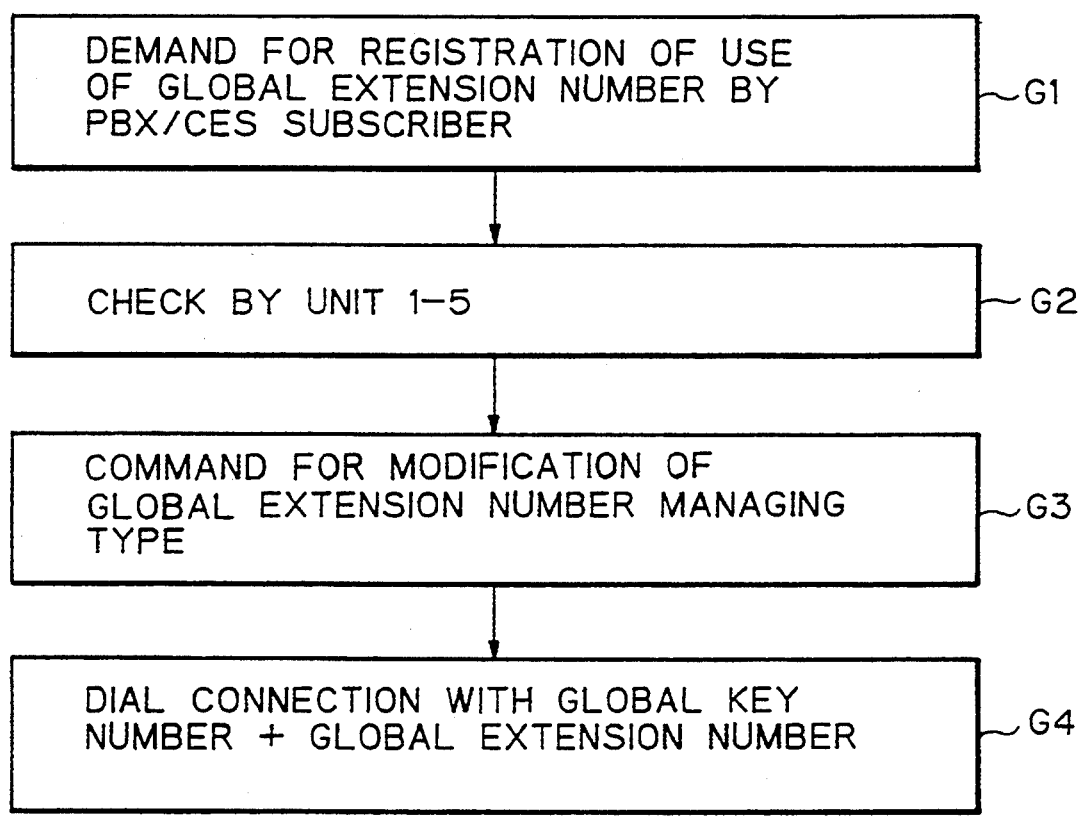
FIG. 20 is a flowchart explaining the operation of the system shown in FIG. 21.
Figure 21:
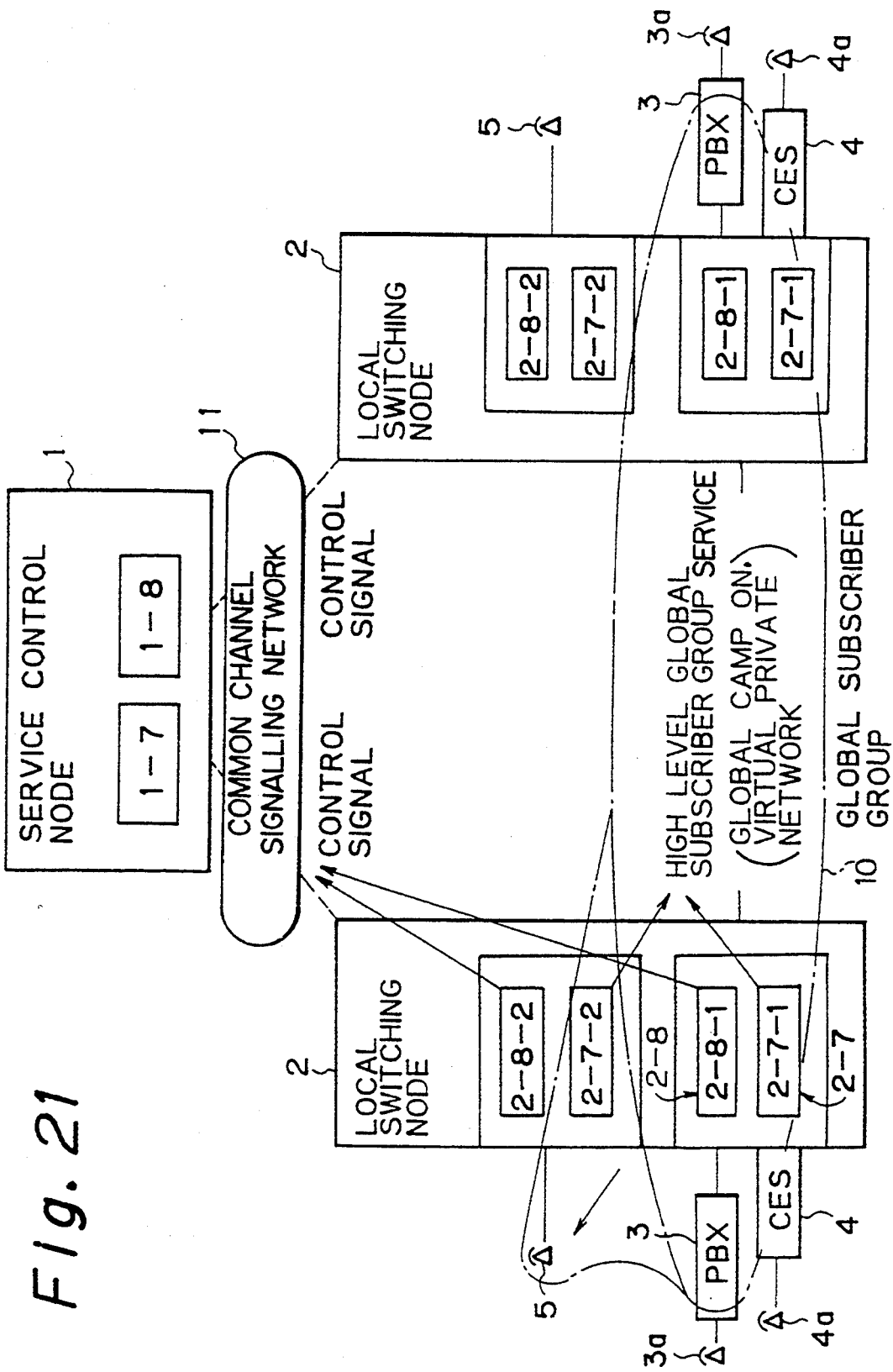
FIG. 21 is a block diagram showing a global subscriber group service system explaining the registering service of an individual subscriber in the global subscriber group according to the fourth embodiment of the present invention.

Also, the service control node 1 commands the modification at the global utilization control unit 1-5 therein, and the utilization access control unit 2-5-1 in the local switching node 2 for the PBX/CES subscribers 3a and 4a, in order to satisfy the demand of the customer (individual subscriber) for the registration of a modification of the global extension number arriving call destination (see (3) of FIG. 20 and step F3 of FIG. 21).

Thus, when the PBX/CES subscriber 3a or 4a dials the global extension number, the call arriving destination can automatically be modified from the original destination to a location to which the registered subscriber has moved or to a representative which is used when the registered subscriber is absent at the original destination, by the utilization control unit 1-5 of the service control node 1 and the PBX/CES utilization access control unit 2-5-1 of the local switching node 2 for the PBX/CES subscriber 3a or 4a. (see (4) of FIG. 17 and step F4 of FIG. 18).

As set forth above, by using the customer access function from the individual subscriber 5 to the service control node 1, the call arrival destination can be flexibly modified to any location to which the registered subscriber has moved or at which a representative is present in stead of the registered subscriber.

A practical process of modification of the destination for delivery of the arriving call is similar to that illustrated in FIGS. 10A-1, 10A-2, 10B-1, 10B-2, and 10B-3 except that, in this embodiment, step B203 carries out a modification of the registering and accommodating location of an extension number; step B204 carries out the reception of the necessary information for modification in accordance with a reception and registration data collecting sequence3 for service modification; step B305 carries out an update of the registered location of the terminal extension number; step B306 carries out an update of the registration of the utilizing position of the extension number, cancels the physical position of the old extension number, and gives an instruction to the service utilization control unit in the local switching node 2; and steps B401 and B402 carry out a communication state control between the service control node and the service utilization control unit in the local switching node, and additional steps for canceling and registering the special service registration after the start of the communication at step B403 are added. Therefore, a detailed description of the practical process of modification is omitted here.

Next, discussion will be given for the company internal number dial connection service for the individual subscriber 5 according to the third embodiment with reference to FIGS. 19 and 20.

At first, the PBX/CES subscriber 3a, 4a demands a registration (including modification and cancellation) of the use of the global extension number for an arriving call from the individual subscriber 5, for the service control node 1, by accessing the modification control unit 1-6 of the service control node 1 through the individual subscriber customer access control unit 2-6-2 of the local switching node 2 for accessing from the individual terminal of PBX/CES subscriber 3a or 4a to the service control node 1. (see (1) in FIG. 19 and step G1 of FIG. 20).

Figure 19:
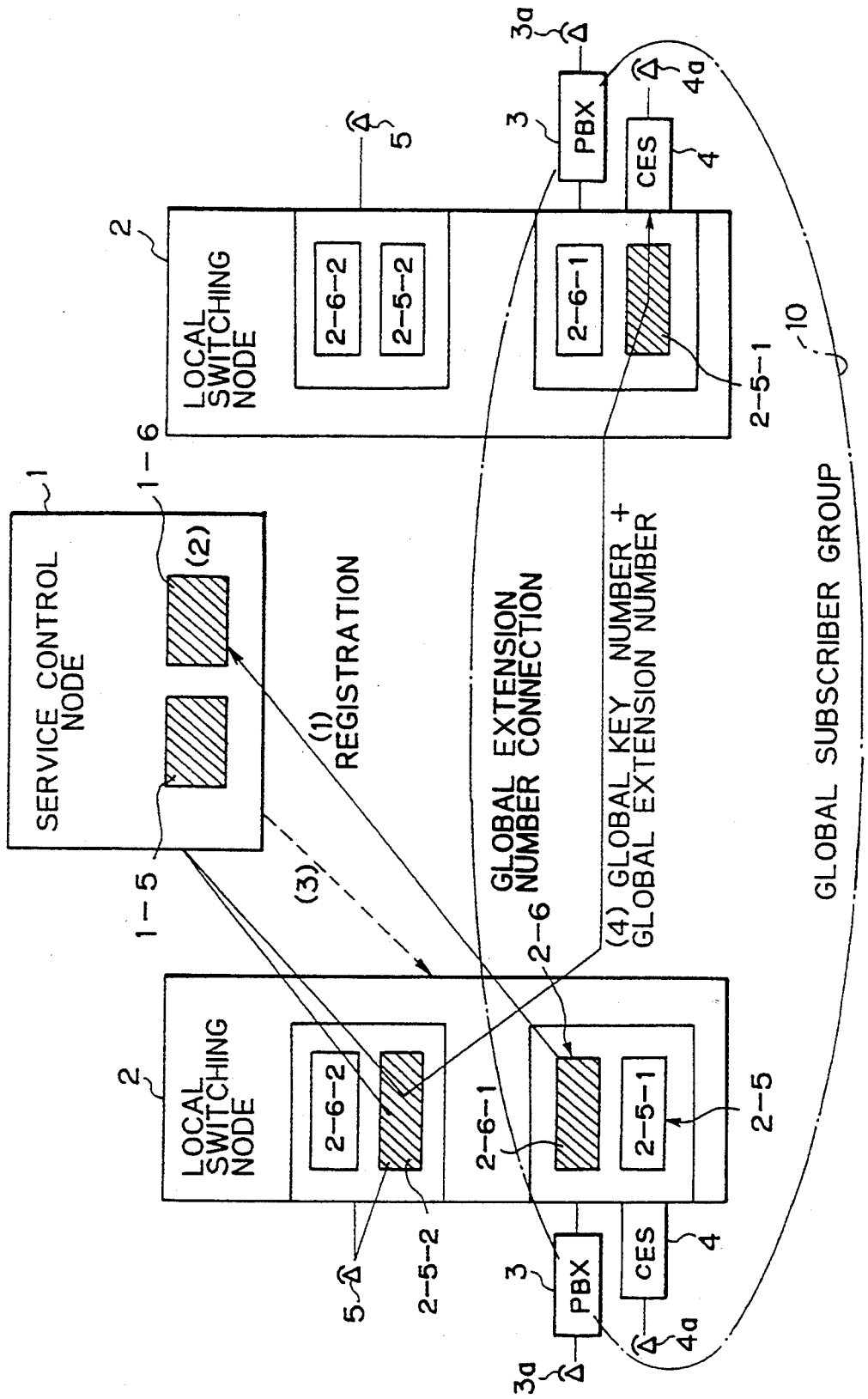
FIG. 19 is a block diagram showing a global subscriber group service system explaining the connecting service through a global extension line for an individual subscriber according to the third embodiment of the present invention.

Then, the modification control unit 1-6 in the service control node 1 performs a security check with the caller number, password and so forth and performs a propriety check of the modification of the use type, confirms the content, provides guidance for modification manner, confirms post-modification image, and the necessity of a test and so forth, with the customer (see (2) in FIG. 19 and step G2 of FIG. 20).

Also, the service control node 1 commands the utilization control unit 1-5 in the service control node 1, and the utilization access control unit 2-5 in the local switching nodes for the PBX/CES subscribers to modification of the global extension number management type, in order to satisfy the demand of the PBX/CES subscriber 3a or 4a for use type (see (3) of FIG. 19 and step G3 of FIG.20).

Thereafter, when one subscriber dials the global key number plus the global extension number, dial connection to the desired call destination becomes possible without regarding the location of the office of the independent subscriber by the service control unit 1-5 in the service control node 1 and the utilization access control unit. 2-5-2 in the local switching node 1 (see (4) in FIG. 19 and step G4 of FIG. 20).

Thus, by dialing the specific number (global key number) and the company internal global extension number in combination, dial connection to the desired call destination regardless of the location of the office of the independent subscriber can be made.

Accordingly, with the third embodiment, the independent subscriber 5 other than the PBX/CES subscriber 3a or 4a can use the global extension number connection service. Also, by providing the customer control function for modification of the global extension number management type, a composite service can be provided by enabling modification control not only by the PBX/CESsubscriber 3a or 4a but also by the individual subscriber 5.

FIG. 21 is a block diagram showing a global subscriber group service system according to a fourth embodiment of the invention for implementing assignment of the individual subscriber as one of the terminals in the global extension system. In the construction of FIG. 25, the service control node 1 includes a utilization control unit 1-7 and a modification control unit 1-8. The utilization control unit 1-7 performs a control for use of services for the global subscriber group. The modification control unit 1-8 for making a global subscriber group into an extension assigns the individual subscriber 5 as one terminal of the global extension system.

On the other hand, the local switching node 2 includes a utilization control unit 2-7 and the customer access control unit 2-8.

The utilization access control unit 2-7 enables the use of a service for the global subscriber service though the modification control unit 1-8 of the service control node 1, and the customer access control unit 2-8 modifies the service type for the global subscriber group 10 by accessing the modification control unit 1-8 from a subscriber terminal included in the local switching node 2.

It should be noted that, in this fourth embodiment also, since the local switching node 2 accommodates the private branch exchange 3 or the centralized exchange 4 for a subscriber group for the PBX/CES subscribers 3a or 4a and individual subscribers 5, the utilization access control unit 2-7 comprises a PBX/CES utilization access control unit 2-7-1 for the PBX/CES subscribers 3a or 4a and an individual subscriber utilization access control unit 2-7-2 for individual subscribers 5. Also, the customer access control unit 2-8 comprises a PBX/CES customer access control unit 2-8-1 for the PBX/CES subscribers 3a or 4a and an individual subscriber customer access control unit 2-8-2 for individual subscribers 5.

With the construction set forth above, use of a service for the global subscriber group 10 is possible by accessing the utilization access control unit 2-7 in the local switching node 2 from the utilization control unit 1-7 in the service control node 1, and modification of the use type of service for the global subscriber group 10 is possible by accessing the modification control unit 1-8 of the service control node 1 through the customer access control unit 2-8 from the subscriber included in the local switching node 2.

Figure 22:
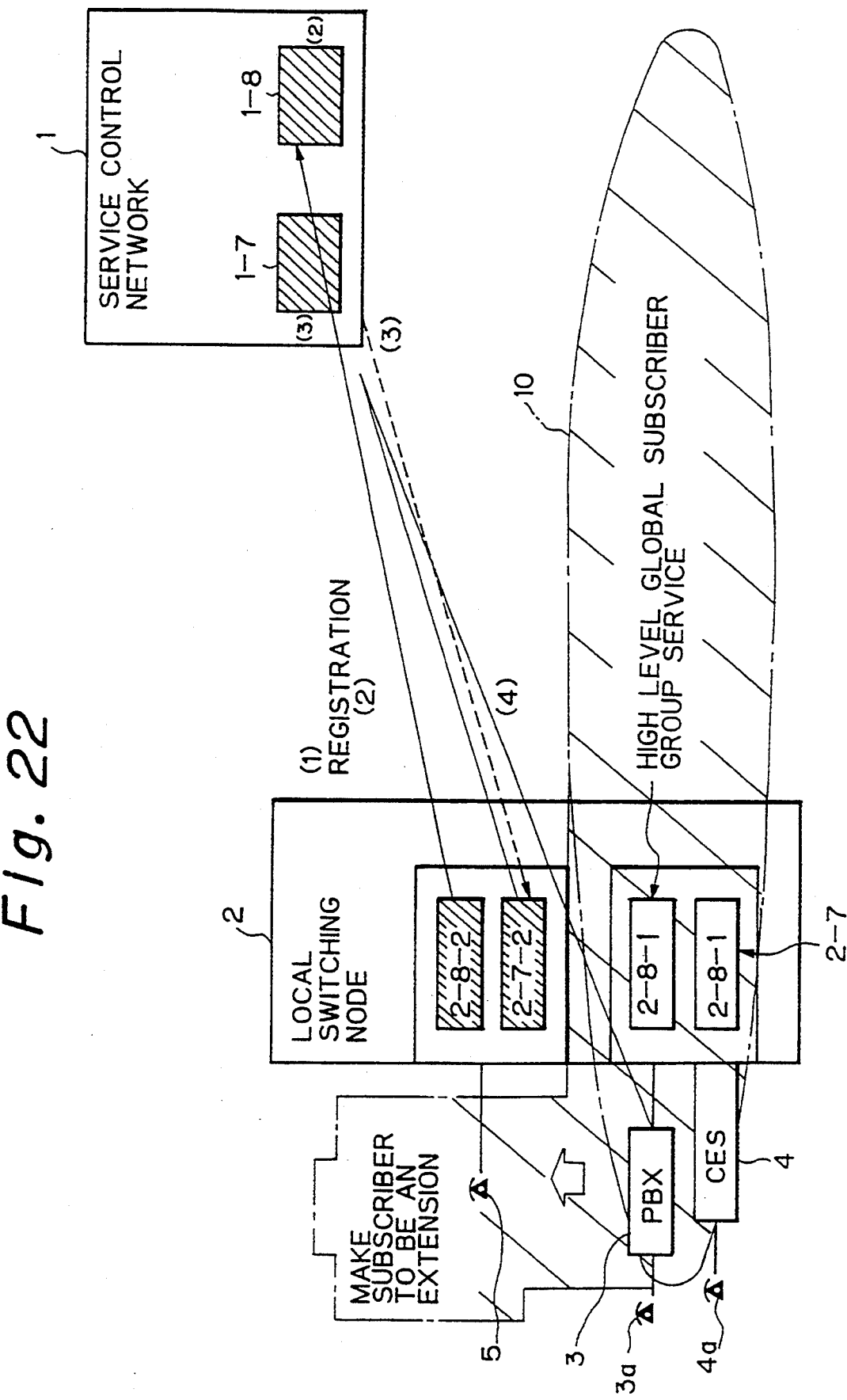
FIG. 22 is a block diagram showing a global subscriber group service system explaining in detail the registering service of an individual subscriber in the global subscriber group according to the fourth embodiment of the present invention.
Figure 23:
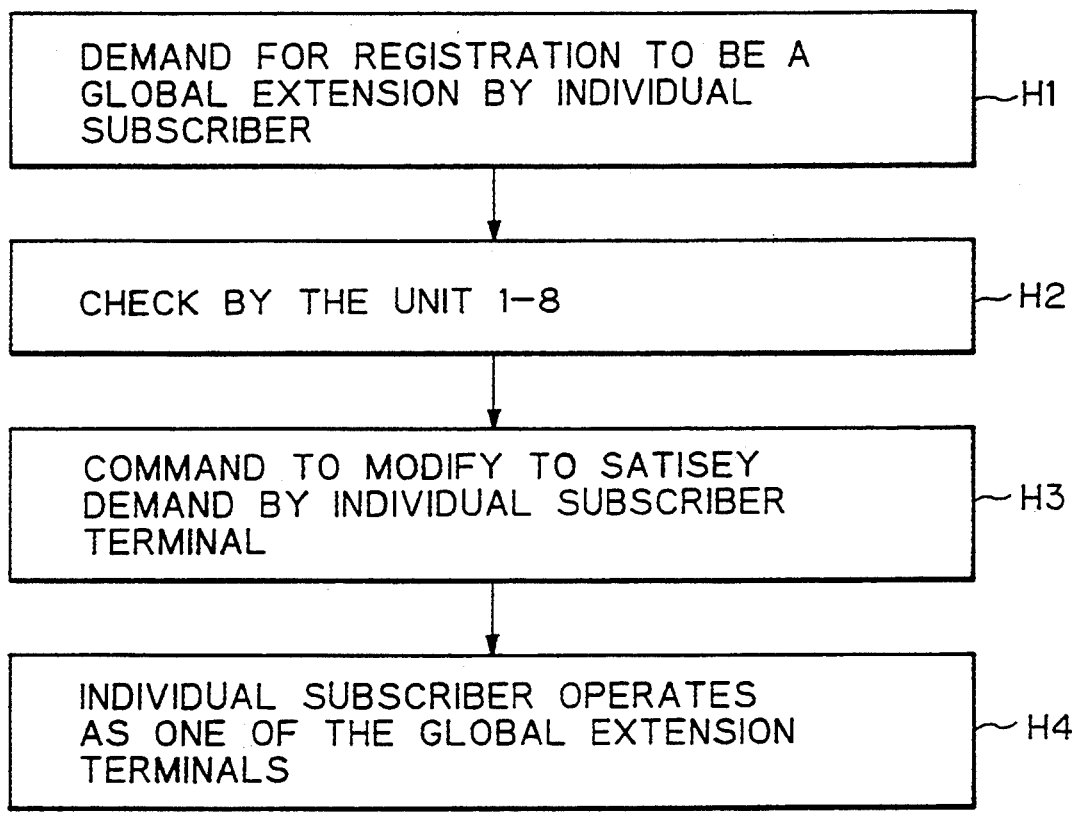
FIG. 23 is a flowchart explaining the operation of the system shown in FIG. 22.

Next, discussion will be provided for an example of the global subscriber group service for the independent subscriber 5, according to the fourth embodiment of the present invention, with reference to FIGS. 22 and 23.

At first, the individual subscriber 5 demands registration (including modification and cancellation) of assignment as one of the terminals in the global extension system. The individual subscriber 5 accesses the modification control unit 1-8 for initiating the customer control function through the individual subscriber customer access control unit 2-8-2 in the local switching node 2 for accessing the service control node 1 from the terminal of the individual subscriber 5 (see (1) in FIG. 22 and step H1 in FIG. 23).

Then, the modification control unit 1-8 in the service control node 1 performs a security check with the caller number, password and so forth and performs a propriety check of the modification of the use type, confirms the content, provides guidance for modification manner, confirms the post-modification image, and the necessity of a test and so forth, with the customer (see(2) in FIG. 22 and step H2 in FIG. 23).

Also, the service control node 1 commands the utilization control unit 1-7 therein, and the utilization access control unit (global service access unit) 2-7 in the local switching node 2 for the individual subscriber 5 to modify, in order to satisfy the demand of the customer (independent subscriber) for making the independent subscriber terminal into the extension (see(3) in FIG. 22 and step H3 of FIG. 23).

Thereafter, the corresponding terminal operates as one of the extension terminals in the global subscriber group of a specific subscriber group (or groups) so that it can receive global subscriber group services (such as a service for enabling independent call connection by dialing 0, a service for enabling global extension number connection, a service for enabling connection to the virtual private network or so forth) provided for the subscriber group (see (4) in FIG. 22 and step H4 in FIG. 23).

It should be noted that it is possible to use the virtual private network through the operations associated with the steps H1 through H3 upon using a service without making a preliminary registration.

On the other hand, it is also possible for the PBX/CES subscribers 3a or 4a to make a registration of the global extension of the individual subscriber terminal through a similar operation.

As set forth above, when the individual subscriber 5 registers terminal use by making it into a global subscriber group extension by accessing the control function for making the global subscriber group, including independent subscribers, into extensions with customer control provided for the service control node 1, previously (or at the time of using the service), it is possible thereafter (or at the same time) to use the global subscriber group services provided for the subscriber group since the corresponding terminal can operate as one of the extension terminals of the global subscriber group of the subscriber groups.

As a further practical example of the fourth embodiment of the present invention, an example of a connection sequence of an extension number connection by the independent subscriber 5 will be discussed with reference to FIGS. 24A and 24B.

Figure 24B:
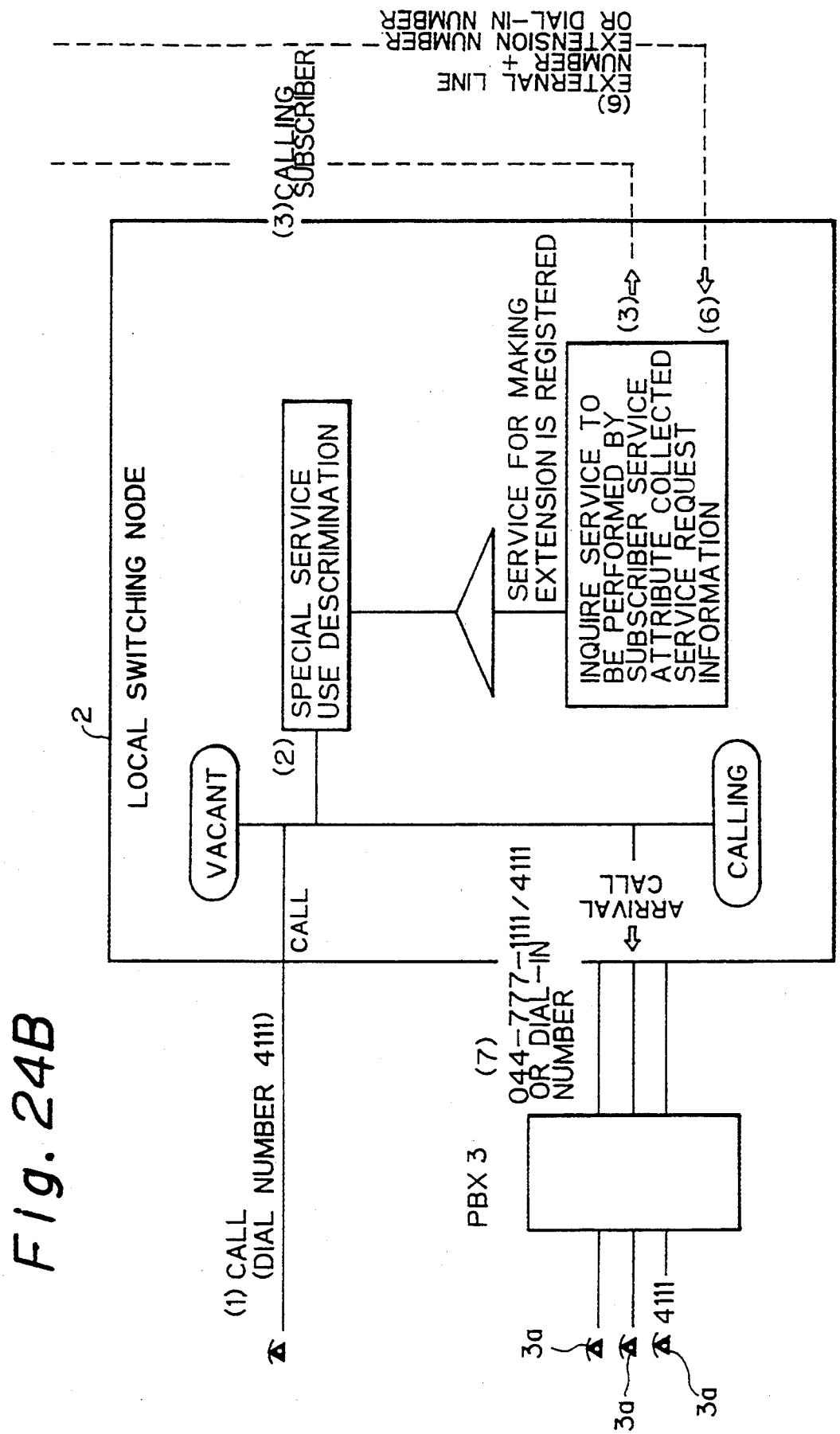
FIG. 24, comprised of FIG. 24A and FIG. 24B, are block diagrams explaining the manner of establishing a connection through an extension line for the individual subscriber according to the fourth embodiment of the present invention.

At first, the individual telephone 5, which has effected a registration as a PBX extension terminal to the utilization control unit 1-7 in the service control node 1, makes a call by dialing an extension number (for example "4111") of the PBX subscriber terminal 3a similar to the action by the PBX extension terminal (see (1) in FIG. 24B).

In response to this call, it is determined whether a special service (in this case, the extension number connection service) is to be used with respect to the subscriber data of the local switching node 2 (see (2) in FIG. 24B).

In this case, since the registration of the extension number connection service exists, an inquiry of the performing service is made with the subscriber service attribute collection service demand information. At this time, the inquiry is made by using the subscriber ID, the dial number information (in this example "4111"), and call event information (see (3) in FIG. 24).

In response to this inquiry, the service control node 1 makes a call to the calling subscriber ID (see (4) in FIG. 24B), initiates an extension connection service, and performs a dial number conversion using the group "1", for example, in the database 1A. It should be noted that, in this example, a conversion is made for "4111" into "044-777-1111/4111" (see (5) in FIG. 24A).

Then, the converted dial number is returned to the local switching node 2 (see (6) in FIG. 24B), and the call arrives at the PBX subscriber terminal 3a of the extension number "4111" included in the PBX 3.

Further discussion will be provided for an automatic connection (transfer) service to a location, to which the registered subscriber has moved, for an arriving call for the specific PBX extension number, according to the fourth embodiment of the present invention, with reference to FIGS. 25A and 25B.

In the shown example, discussion will be made for the case, in which the arriving call from the third party "a" to the specific PBX extension number terminal 3a (see terminal shown by label "b", the extension number of which is "4111" for example) is connected by transferring the same to the changed location terminal "c" (this telephone number is "045-201-XXXX" for example).

At first, the destination to the movement is previously registered in the data base 1A connected to the service control node 1 with respect to the changed location terminal "c" (see (1) in FIG. 25A). It should be noted that this registration can be done though the specific PBX extension number terminal 3a (b).

Thereafter, when a call arrives from the third party "a", which has received the service for making it into an extension, to the specific PBX extension number terminal 3a (b) (see (2) of FIG. 25B), it is determined whether a special service (in this case, the extension number connection service) is to be used with respect to the subscriber data in the local switching node 2 (see (3) in FIG. 25B).

In this case, since the registration of the extension number connection service exists, an inquiry of the performing service is made with the subscriber service attribute collection service demand information. At this time, the inquiry is made by using the subscriber ID, the dial number information (in this example "4111"), and the call event information (see (4) in FIG. 25B).

In response to this inquiry, the service control node 1 makes a call to the called subscriber ID (see (5) in FIG. 25A) to initiate a transfer service and to perform a dial number conversion using the group "1", for example, in the data base 1A. Namely, the external line number + extension number or the dial-in number is converted into the changed location number. In the shown example, the conversion is made from "044-777-1111/4111" to "045-201-XXXX" (see (6) in FIG. 25A).

Then, the converted dial number is returned to the local switching node 2 (see (7) in FIG. 25B), and the arriving call is transferred (see (8) in FIG. 25B). Therefore, the arrival of a call to the changed location can be realized (see (9) of FIG. 29).

As set forth above, the arriving call from the third party "a" to the specific PBX extension number terminal 3a can be transferred and connected to the changed location terminal "c".

According to the fourth embodiment set forth above, by cooperation of the additional function of the service control node 1 and the local switching node 2, it becomes possible to provide wide range, flexible and highly responsive global subscriber group service including the independent subscriber 5 as well as the PBX/CES subscriber 3a, 4a.

FIG. 26 is a block diagram showing a global subscriber group service system according to a fifth embodiment of the present invention, which is implemented temporarily including a subscriber terminal or terminals belonging in the other global subscriber group as one or a group of terminals in the global subscriber group 10 in question. In the construction of FIG. 26, the service control node 1 includes a utilization control unit 1-9 and a modification control unit 1-10. The utilization control unit 1-9 performs a control for using services for the global subscriber group, and the modification control unit 1-10 modifies the type of services for the global subscriber group 10. On the other hand, the local switching node 2 in the global subscriber group 10 includes service access control units 2-9 and customer access control units 2-10. The service access control units 2-9 enable the use of the global subscriber service though the utilization control unit 1-9 in the service control node 1, and customer access control units 2-10 modify the use type for the global subscriber group 10 by accessing the global subscriber group use type modifying unit 1-10 in the service control node 1 from a subscriber included in the local switching node 2.

The utilization access control units 2-9 comprise a PNX/CES utilization access control unit 2-9-1 for the PBX/CES subscribers 3a or 4a and an individual utilization access control unit 2-9-2 for individual subscribers 5. Similarly, the customer access control units 2-10 comprise a PBX/CES customer access control unit 2-10-1 for the PBX/CES subscribers 3a or 4a and an individual customer access control unit 2-10-2 for individual subscribers.

With the shown construction, use of services for the global subscriber group 10 is made possible by accessing the utilization access control unit 2-9 in the local switching node 2 from the utilization control unit 1-9 in the service control node 1, and modification of the type of service for the global subscriber group 10 is possible by accessing the modification control unit 1-10 in the service control unit 1 through the customer access control unit 2-10 from the subscriber accommodated in the local switching node 2.

Figure 27:
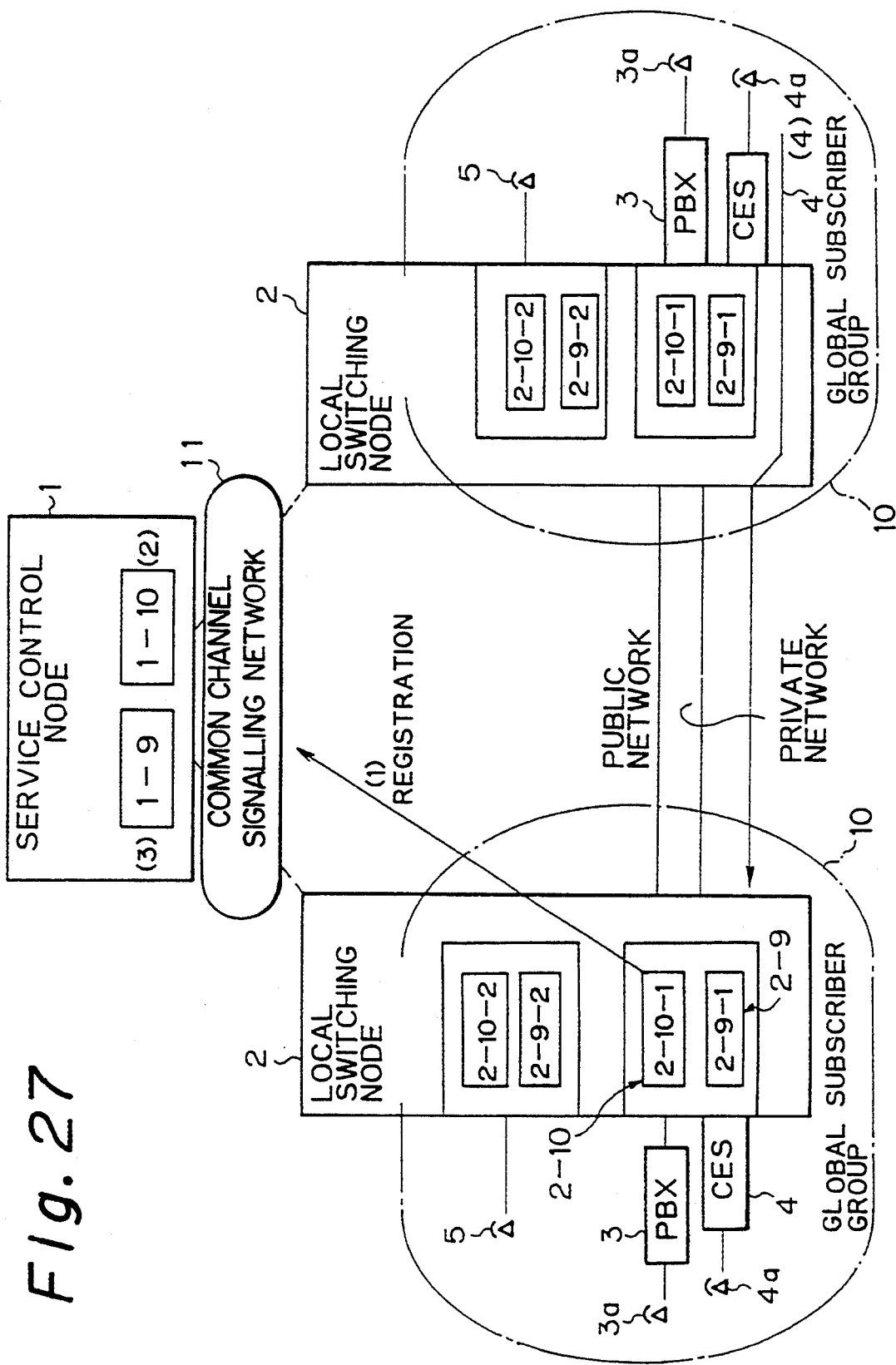
FIG. 27 is a schematic block diagram of the global subscriber group service system explaining a service for temporarily assigning a subscriber group out of the global subscriber group as subscribers within the global subscriber group, according to the fifth embodiment of the present invention.
Figure 28:
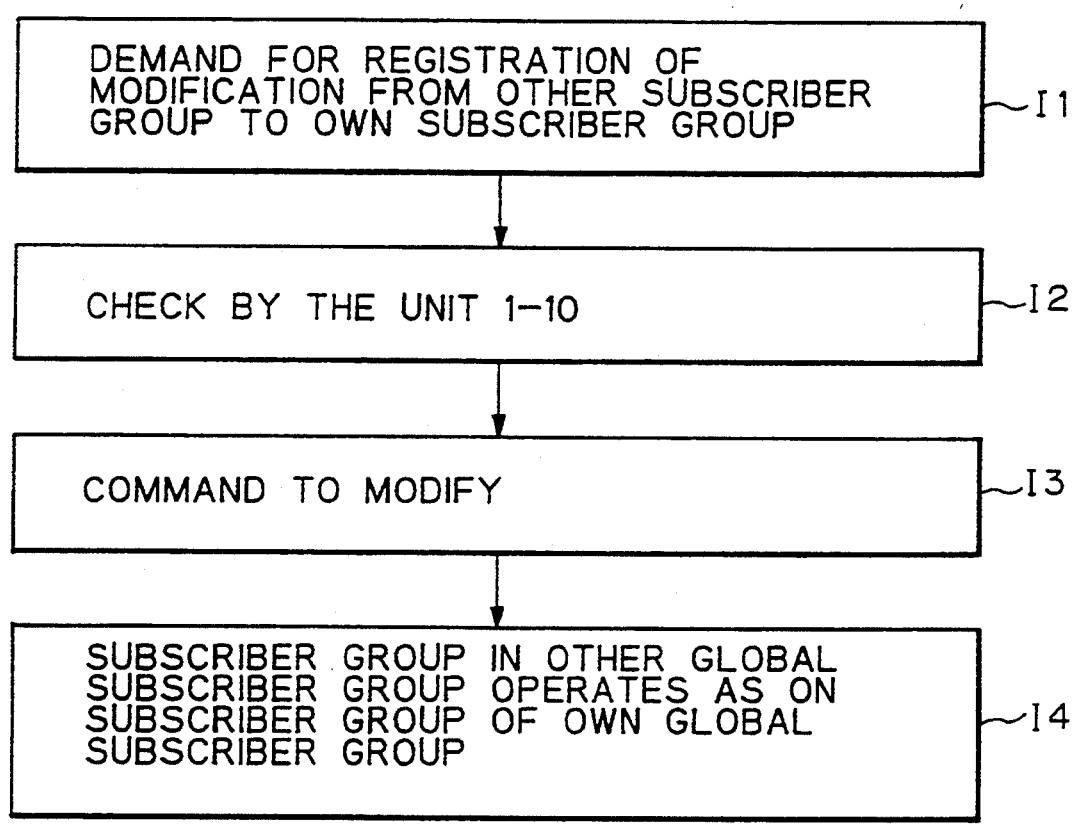
FIG. 28 is a flowchart explaining the operation of the system shown in FIG. 27.

Next, discussion will be provided for an example of a modification of global subscriber group management between the subscriber groups, according to the fifth embodiment of the present invention, with reference to FIGS. 27 and 28.

At first, the PBX/CES subscriber 3a or 4a demands a registration (including modification and cancellation) of modification of use type in such a way that a specific terminal group belonging to the other subscriber group is treated as one subscriber group belonging to the own global subscriber group, by accessing the global subscriber group service utilization modification unit 1-10, which has a control function for flexibly modifying the type of utilization of the subscriber group service type provided in the service control node 1, through the customer access control unit 2-10-1 in the local switching node 2 (see (1) of FIG. 27 and step I1 of FIG. 28).

Then, the utilization control unit 1-10 in the service control node 1 performs a security check with the caller number, password and so forth and performs a propriety check of the modification of the use type, confirms the content, provides guidance for modification manner, confirms the post-modification image, and the necessity of a test and so forth, through a communication with the customer. (see (2) in FIG. 27 and step I2 in FIG. 28).

Also, the service control node 1 issues an instruction to modify the contents in the service utilization control unit 1-9 in the service control node 1 and the contents in the service utilization access control unit 2-9-1 in the local switching node 2 to satisfy the demand for the registration of the modification of the specific terminal group from a registration in which the specific terminal group belongs to the other subscriber group to a registration in which the specific terminal group belongs to the own global subscriber group (see (3) in FIG. 27 and step I3 in FIG. 28).

Thereafter, the terminal group in question belonging to the other subscriber service group is operated as one subscriber group belonging to the own subscriber group to make it possible to receive the global subscriber service provided for the subscriber group (see (4) in FIG. 27 and step I4 in FIG. 28).

Figure 29:
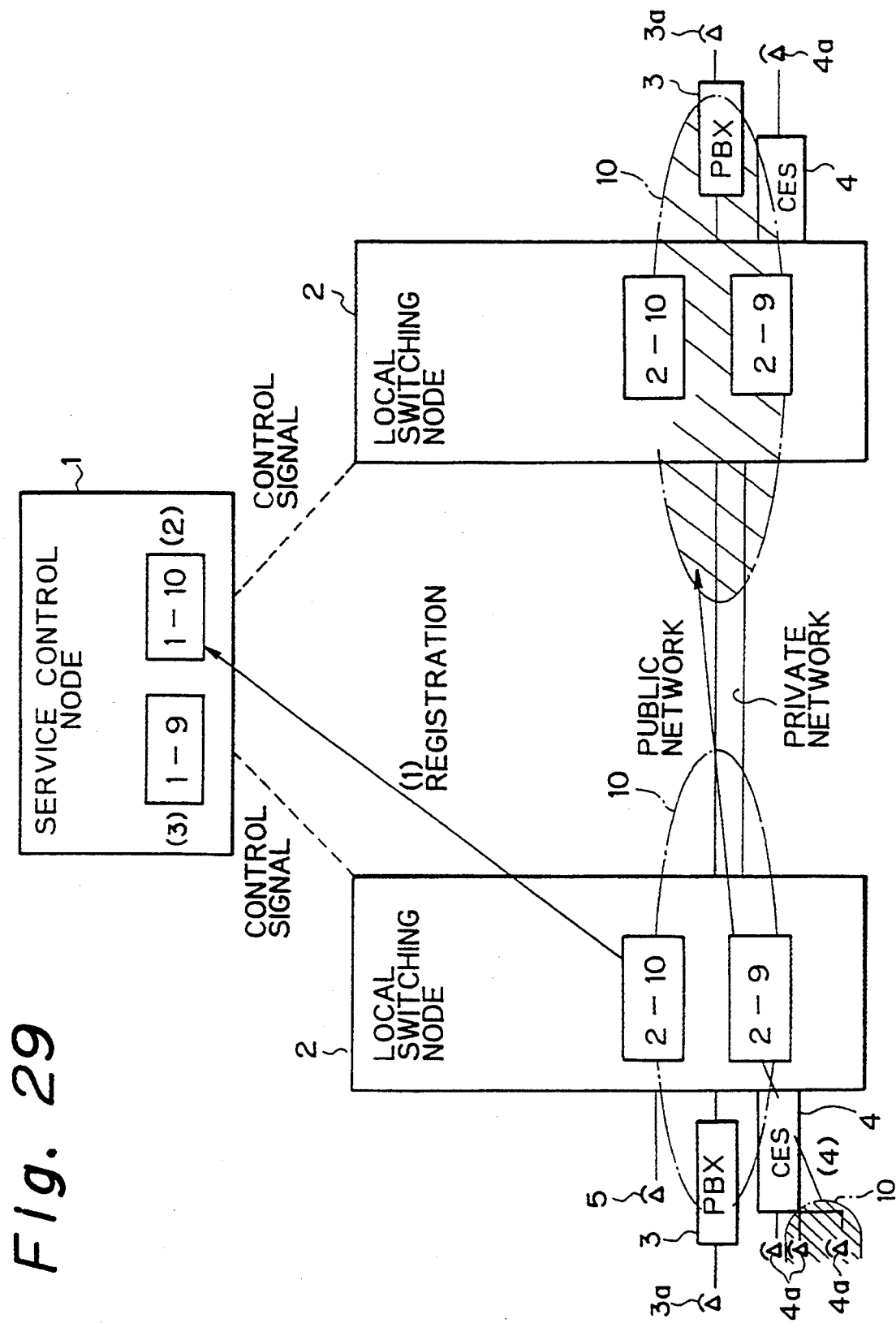
FIG. 29 is a block diagram of the global subscriber group service system explaining in detail a service for temporarily assigning a subscriber group out of the global subscriber group as subscribers within the global subscriber group, according to the fifth embodiment of the present invention.

On the other hand, where three global subscriber groups 10 exist as shown in FIG. 29, it is also possible to perform a similar operation (the figures with brackets in FIG. 29 correspond to those in FIG. 27).

It should be noted that by the individual subscriber, a similar registration through a similar operation is possible.

Thus, after the PBX/CES subscriber 3a or 4a, or the independent subscriber previously accesses the modification control unit 1-10 in the service control node 1 to register the modification of the service utilization type in such a way that specific terminals belonging to the other subscriber group are treated as one subscriber group belonging to the own global subscriber group, the terminal group is operated as a global CES extension terminal group in a specific subscriber group or plural subscriber groups so that the registered group can enjoy the global subscriber group service provided to the own global subscriber group.

Figure 30:
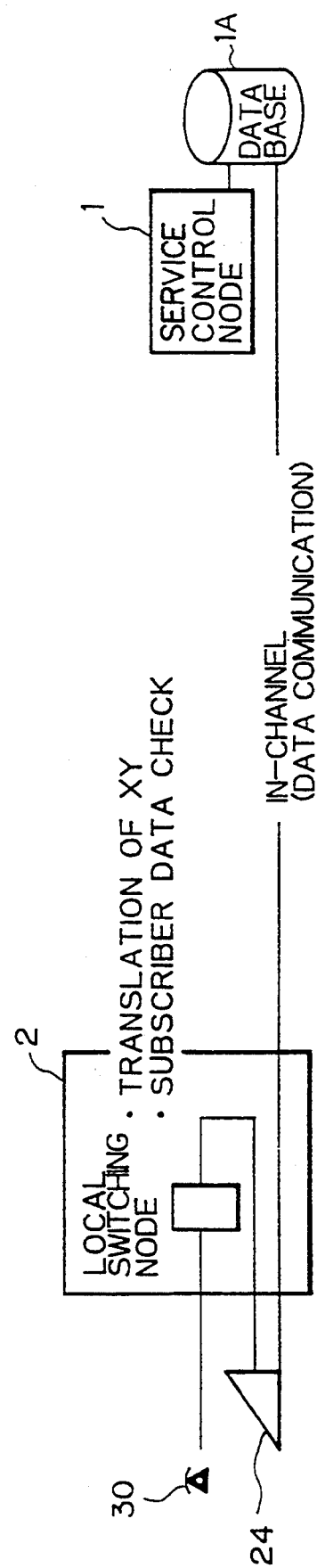
FIG. 30 is a block diagram showing a global subscriber group service system in which a specialized terminal has the function of the customer access control and the service utilization access control, according to a sixth embodiment of the present invention.

FIG. 30 is a block diagram showing a global subscriber group service system according to a sixth embodiment of the present invention. In the FIG. 30 is a subscriber terminal such as an analog telephone set or an ISDN terminal. Instead of providing the utilization access control unit 2-1-2 and the customer access control unit 2-2-2 in the local switching node 2, the service accessing unit and the customer access control unit is provided in a customer accessing special terminal 24. The customer accessing special terminal may be, for example, a personal computer having a man-machine interface (MMI) and a push button (PB) receiver talkie converting function. In this case, the operation by the telephone set 30 for registering the subscriber terminal 30 as a member of the global subscriber group, for cancelling the registration as a member of the global subscriber group, or for modifying the service type is carried out as follows.

At first, the subscriber of the subscriber terminal 30 dials a specific number for customer access to connect the subscriber terminal 30 to a specialized customer access terminal 24 such as a personal computer and so forth, having MMI-PB receiver talkie protocol converting function.

Then, the subscriber requests to be registered, to be cancelled, or to modify the services to the specialized customer access terminal 24. In response to the request from the subscriber, the specialized customer access terminal 24 immediately, or after a given period, accesses the service utilization control unit 1-1 or the service utilization modification unit 1-2 in the utilization control unit 1, whereby a data base 1A in the service control node 1 is accessed immediately or after a certain period, by the specialized customer terminal 24, in accordance with guidance or acknowledging talkies through push button in-channel signals and so forth. Thus, the registration, the cancellation, or the modification of services are performed.

As mentioned above, the specialized customer access terminal 24 accesses the data base 1A of the service control node 1 through data communication and so forth to perform a modification of the service use type and so forth. At this time, between the specialized customer access terminal 24 and the data base 1A, modification of the service type and so forth is permitted while maintaining security by using a call ID (call identification number), a CUG (closed user group service), a password, and so forth. It should be noted that, for such modification of the service use type, a modification fee may be payable separately from the communication fee.

From the foregoing description, it will be apparent that, according to the present invention, a flexible global subscriber group service system can be provided in which global subscriber group services including the use of a virtual private network or virtual global extension system, including an extension close number connection service and so forth, are possible not only by group subscribers but also by an independent subscriber or other subscriber groups, and any customer can modify the use type of the global subscriber group services.

What is claimed is:

1. A global subscriber group service system providing high level global communication services to individual subscribers and business subscribers each making requests, the global subscriber group service system comprising:
   local switching nodes accommodating the individual subscribers and the business subscribers and sending and receiving control messages;
   a service control node sending and receiving the control messages and centrally controlling the high level global communication services;
   a common channel signalling network, coupled to the local switching nodes and to the service control node, through which the local switching nodes and the service control node each send and receive the control messages; and
   a global subscriber group comprising members of the individual subscribers and the business subscribers, said service control node comprising:
      global subscriber group service utilization control means for controlling utilization of the high level global communication services for said global subscriber group; and
      global subscriber group service utilization type modification means for modifying use types of said high level global communication services for said global subscriber group;
   each of said local switching nodes comprising:
      global subscriber group service utilization access control means for recognizing one of the high level global communication services invoked by said global subscriber group, and for enabling the utilization of the high level global communication services for said global subscriber group by accessing said global subscriber group utilization control means in said service control node; and
      customer access control means for changing attributes of a subscriber line dynamically and temporarily, and for accessing said global subscriber group service utilization type modification means in said service control node, in response to one of the requests made by one of the individual subscribers and the business subscribers accommodated by one of said local switching nodes;
   wherein one of the high level global communication services provided to the global subscriber group is utilized by accessing from said global subscriber group service utilization access control means in one of said local switching nodes to the global subscriber group service utilization control means in said service control node; and
   modification of a utilization type of one of the high level global communication services provided to the global subscriber group is performed by accessing said global subscriber group service utilization type modification means in said service control node through the customer access control means from one of the individual subscribers and the business subscribers accommodated by the one of said local switching nodes.

2. A global subscriber group service system as claimed in claim 1, wherein, each of said global subscriber group service utilization control means, said global subscriber group service utilization type modification means, said global subscriber group service utilization access control means, and said customer access control means comprises a processor and a data base connected to said processor, said data base storing said use types.

3. A global subscriber group service system as claimed in claim 1, wherein each of said local switching nodes is connected to at least one of a private branch exchange and a centralized exchange switch to accommodate group subscribers, and each of said local switching nodes further accommodates the individual subscribers;
   said global subscriber group service utilization access control means comprising group service utilization access control means for enabling utilization of the high level global communication services by said group subscribers accommodated by at least one of said private branch exchange and said centralized exchange switch, and further comprising individual service utilization access control means for enabling utilization of the high level global communication services by said individual subscribers; and
   said customer access control means comprising group customer access control means for accessing said global subscriber group service utilization type modification means by said group subscribers, and further comprising individual customer access control means for accessing said global subscriber group service utilization type modification means by said individual subscribers.

4. A global subscriber group service system providing high level global communication services to individual subscribers and business subscribers each making requests, the global subscriber group service system comprising:

local switching nodes accommodating the individual subscribers and the business subscribers and sending and receiving control messages;

a service control node sending and receiving the control messages and centrally controlling the high level global communication services;

a common channel signalling network, coupled to the local switching nodes and to the service control node, through which the local switching nodes and the service control node each send and receive the control messages;

a global subscriber group comprising members of the individual subscribers and the business subscribers; and a virtual private network comprising the local switching nodes, said service control node comprising:
  virtual private network utilization control means for controlling utilization of the virtual private network for said global subscriber group; and
  virtual private network utilization type modification means for modifying utilization types of said virtual private network for said global subscriber group;

each of said local switching nodes comprising:
  virtual private network utilization access control means for enabling utilization of the virtual private network for said global subscriber group by accessing said virtual private network utilization control means in said service control node; and
  customer access control means for accessing said virtual private network utilization type modification means in said service control node in response to one of the requests made by one of the individual subscribers and the business subscribers accommodated by one of said local switching nodes;

wherein the virtual private network is utilized by the global subscriber group by accessing from said virtual private network utilization access control means in the one of said local switching nodes to the virtual private network utilization control means in said service control node; and modification of a utilization type of the virtual private network for the global subscriber group is performed by accessing said virtual private network utilization type modification means in said service control node through the customer access control means from one of the individual subscribers and business subscribers accommodated by the one of said local switching nodes.

5. A global subscriber group service system as claimed in claim 4, wherein, each of said virtual private network utilization control means, said virtual private network utilization type modification means, said virtual private network utilization access control means, and said customer access control means comprises a processor and a data base connected to said processor, said data base storing said utilization types of said virtual private network to be utilized.

6. A global subscriber group service system as claimed in claim 4, wherein each of said local switching nodes is connected to at least one of a private branch exchange or a centralized exchange switch to accommodate group subscribers, and each of said local switching nodes further accommodates the individual subscribers;

said virtual private network utilization access control means comprising group service utilization access control means for enabling the utilization of the virtual private network by said group subscribers accommodated by at least one of said private branch exchange and said centralized exchange switch, and further comprising individual service utilization access control means for enabling the utilization of the virtual private network by said individual subscribers; and said customer access control means comprising group customer access control means for accessing said virtual private network utilization type modification means by said group subscribers, and further comprising individual customer access control means for accessing said virtual private network utilization type modification means by said individual subscribers.

7. A global subscriber group service system providing high level global communication services to individual subscribers and business subscribers each making requests, the global subscriber group service system comprising:

local switching nodes accommodating the individual subscribers and the business subscribers and sending and receiving control messages;

a service control node sending and receiving the control messages and centrally controlling the high level global communication services;

a common channel signalling network, coupled to the local switching nodes and to the service control node, through which the local switching nodes and the service control node each send and receive the control messages; and a global subscriber group comprising members of the individual subscribers and the business subscribers, said service control node comprising:
  global extension number management control means for controlling management of extension numbers for said global subscriber group; and
  global extension number management type modification means for modifying management types of said extension numbers for said global subscriber group;

each of said local switching nodes comprising:
  global extension number connection utilization access control means for enabling the management of the extension numbers for said global subscriber group by accessing said global extension number management control means in said service control node; and
  customer access control means for accessing said global extension number management type modification means in said service control node in response to one of the requests made by one of the individual subscribers and business subscribers accommodated by one of said local switching nodes;

wherein extension numbers for the global subscriber group are managed by accessing from said global extension number connection utilization access control means in one of said local switching nodes to the global extension number management control means in said service control node; and modification of the management of extension numbers for the global subscriber group is performed by accessing said global extension number management type modification means in said service control node through the customer access control means from one of the individual subscribers and business subscribers accommodated by one of said local switching nodes.

8. A global subscriber group service system as claimed in claim 7, wherein, each of said global extension number management control means, said global extension number management type modification means, said global extension number connection utilization access control means, and said customer access control means comprises a processor and a data base connected to said processor, said data base storing said management types to be utilized.

9. A global subscriber group service system as claimed in claim 7, wherein each of said local switching nodes is connected to at least one of a private branch exchange or a centralized exchange switch to accommodate group subscribers, and each of said local switching nodes further accommodates individual subscribers;

said global extension number connection utilization access control means comprising group service utilization access control means for enabling the management of the extension numbers for said group subscribers accommodated by at least one of said private branch exchange and said centralized exchange switch, and further comprising individual service utilization access control means for enabling the management of the extension numbers for said individual subscribers; and said customer access control means comprising group customer access control means for accessing said global extension number management type modification means by said group subscribers, and further comprising individual customer access control means for accessing said global extension number management type modification means by said individual subscribers.

10. A global subscriber group service system providing high level global communication services to individual subscribers and business subscribers each making requests, the global subscriber group service system comprising:

local switching nodes accommodating the individual subscribers and the business subscribers and sending and receiving control messages;

a service control node sending and receiving the control messages and centrally controlling the high level global communication services;

a common channel signalling network, coupled to the local switching nodes and to the service control node, through which the local switching nodes and the service control node each send and receive the control messages; and a global subscriber group comprising members of the individual subscribers and the business subscribers, said service control node comprising:

global subscriber group service utilization control means for controlling utilization of the high level global communication services for said global subscriber group; and global subscriber group extension control means for controlling an extension designating said global subscriber group;

each of said local switching nodes comprising:

global subscriber group service utilization access control means for enabling utilization of the high level global communication services for said global subscriber group by accessing said global subscriber group utilization control means in said service control node; and global subscriber group extension service registering customer access control means for accessing said global subscriber group extension control means in said service control node in response to one of the requests made by one of the individual subscribers and business subscribers accommodated by one of said local switching nodes;

wherein one of the high level global communication services for the global subscriber group is utilized by accessing from said global subscriber group service utilization access control means in one of said local switching nodes to the global subscriber group service utilization control means in said service control node; and rendering to one of the individual subscribers and business subscribers the extension designating said global subscriber group by accessing said global subscriber group extension control means in said service control node through said global subscriber group service utilization access control means by one of the individual subscribers and business subscribers accommodated by one of said local switching nodes.

11. A global subscriber group service system as claimed in claim 10, wherein, each of said global subscriber group service utilization control means, said global subscriber group extension control means, said global subscriber group service utilization access control means, and said global subscriber group extension service registering customer access control means comprises a processor and a data base connected to said processor, said data base storing said extension service types to be utilized.

12. A global subscriber group service system as claimed in claim 10, wherein the each of said local switching nodes is connected to at least one of a private branch exchange and a centralized exchange switch for accommodating group subscribers, and the each of said local switching nodes further accommodates the individual subscribers;

said global subscriber group extension service utilization access control means comprising group service utilization access control means for enabling the utilization of the high level global communication services by said group subscribers accommodated by at least one of said private branch exchange and said centralized exchange switch, and further comprising individual service utilization access control means for enabling the utilization of the high level global communication services by said individual subscribers; and said global subscriber group extension service registering customer access control means comprising group customer access control means for accessing said global subscriber group extension control means by said group subscribers, and further comprising individual customer access control means for accessing said global subscriber group extension control means by said individual subscribers.

13. A global subscriber group service system providing high level global communication services to individual subscribers and business subscribers each making requests, the global subscriber group service system comprising:

local switching nodes accommodating the individual subscribers and the business subscribers and sending and receiving control messages;

a service control node sending and receiving the control messages and centrally controlling the high level global communication services;

a common channel signalling network, coupled to the local switching nodes and to the service control node, through which the local switching nodes and the service control node each send and receive the control messages; and a plurality of global subscriber groups, each global subscriber group comprising members of the individual subscribers and the business subscribers, said service control node comprising:

global subscriber group management and operation control means for controlling utilization of the high level global communication services for each of said plurality of global subscriber groups; and global subscriber group service utilization type modification means for modifying use types of said high level global communication services for each of said plurality of global subscriber groups;

each of said local switching nodes in each of said global subscriber groups comprising:

global subscriber group service utilization access control means for enabling the utilization of the high level global communication services for said plurality of global subscriber groups accommodated by said local switching nodes by accessing said global subscriber group management and operation control means in said service control node; and customer access control means for accessing said global subscriber group service utilization type modification means in said service control node in response to one of the requests made by one of the individual subscribers and the business subscribers accommodated by said local switching nodes;

wherein utilization of one of the high level global communication services provided to the plurality of global subscriber groups accommodated by said local switching nodes is performed by accessing from said global subscriber group service utilization access control means in one of said local switching nodes to the global subscriber group management and operation control means in said service control node; and modification of a utilization type of one of the high level global communication services provided to the plurality of global subscriber groups accommodated by said local switching nodes is performed by accessing said global subscriber group service utilization type modification means in said service control node through the customer access control means from one of the individual subscribers and the business subscribers accommodated by one of said local switching nodes.

14. A global subscriber group service system as claimed in claim 13, wherein, each of said global subscriber group management and operation control means, said global subscriber group service utilization type modification means, said global subscriber group service utilization access control means, and said customer access control means comprises a processor and a data base connected to said processor, said data base storing said service types to be utilized.

15. A global subscriber group service system as claimed in claim 13, wherein each of said local switching nodes is connected to at least one of a private exchange or a centralized exchange switch to accommodate group subscribers, and each of said local switching nodes further accommodates the individual subscribers;

said global subscriber group service utilization access control means comprising group service utilization access control means for enabling the utilization of the high level global communication services provided to said group subscribers accommodated by at least one of said private branch exchanges and said centralized exchange switch, and further comprising individual service utilization access control means for enabling the utilization of the high level global communication services provided to said individual subscribers; and said customer access control means comprising group customer access control means for accessing said global subscriber group service utilization type modification means by said group subscribers, and further comprising individual customer access control means for accessing said global subscriber group service utilization type modification means by said individual subscribers.

* * * * *

UNITED STATES PATENT AND TRADEMARK OFFICE
CERTIFICATE OF CORRECTION

PATENT NO. : 5,422,940

DATED : June 6, 1995

INVENTOR(S) : Kazumi ENDO et al.

It is certified that error appears in the above-indentified patent and that said Letters Patent is hereby corrected as shown below:

Col. 16, line 5, delete [of] first occurrence;

Col. 21, line 62, delete [.] after "unit".

Signed and Sealed this

Twenty-eighth Day of November 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,422,940
DATED : June 6, 1995
INVENTOR(S) : Kazumi ENDO et al.

It is certified that error appears in the above-indentified patent and that said Letters Patent is hereby corrected as shown below:

Col. 4, line 22, change "by" to --to--, and change "to" to --by";

Signed and Sealed this

Fifth Day of November, 1996

*Attest:*

BRUCE LEHMAN

*Attesting Officer*      *Commissioner of Patents and Trademarks*